(12) United States Patent
Suzuki

(10) Patent No.: US 8,031,378 B2
(45) Date of Patent: Oct. 4, 2011

(54) DEVICE FOR CONTROLLING IMAGE PROCESSING BASED ON PAPER FINGERPRINT

(75) Inventor: Katsunari Suzuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 704 days.

(21) Appl. No.: 12/104,850

(22) Filed: Apr. 17, 2008

(65) Prior Publication Data
US 2008/0266610 A1 Oct. 30, 2008

(30) Foreign Application Priority Data
Apr. 24, 2007 (JP) ................................. 2007-114607

(51) Int. Cl.
*H04N 1/40* (2006.01)
(52) U.S. Cl. .......................... 358/3.28; 358/470; 358/468
(58) Field of Classification Search .................. 358/475, 358/468, 539, 470, 400, 500, 2.1, 1.9, 3.28; 382/115, 306–307
See application file for complete search history.

(56) References Cited

U.S. PATENT DOCUMENTS 7,058,215 B2   6/2006   Ikeda et al.
7,612,920 B2 *  11/2009  Fujishige et al. ............. 358/402
7,809,156 B2 * 10/2010  Piersol et al. ................. 382/100

* cited by examiner

*Primary Examiner* — Thomas D Lee
*Assistant Examiner* — Stephen M Brinich
(74) *Attorney, Agent, or Firm* — Fitzpatrick, Cella, Harper & Scinto

(57) ABSTRACT

There is provided an image forming device that does not require an original image scanning operation upon copying of an original for the second time or later in a device for preventing illegal copying with the use of paper fingerprint information. Upon registration of the paper fingerprint information, original image data is scanned from the original. Also, the paper fingerprint information is scanned. The image forming device associates the original image data and the paper fingerprint information with each other to register them in an information processing device. Upon copying, paper fingerprint information scanned from an original is transmitted to the information processing device to request the device to determine whether or not the paper fingerprint information has been registered. If the paper fingerprint information has been registered is received, the original image data registered in association with the paper fingerprint information is retrieved from the information processing device.

11 Claims, 26 Drawing Sheets

DEVICE FOR CONTROLLING IMAGE PROCESSING BASED ON PAPER FINGERPRINT

BACKGROUND OF THE INVENTION

1. Field of the Invention

The present invention relates to a device that, in order to guarantee originality of a document, uses a paper fiber pattern (hereinafter referred to as "paper fingerprint information") of paper as identification information on the paper to identify the paper, and on the basis of a result of the identification, controls image processing.

2. Description of the Related Art

There has been proposed a method for preventing an original from being illegally copied on the basis of identification information embedded in the original when the original of an important document such as a contract or certificate is copied. According to the method, it is determined, for example, on the basis of the identification information whether or not the number of times the original has been copied is equal to or more than a predetermined number of times, and if the copying has been performed the predetermined number of times or more, a warning message is issued to a user to make the user select whether to forcedly perform or cancel copying. However, in this method, a digital watermark, IC chip, barcode, or the like should be used to preliminarily add (embed, attach, print, etc.) the identification information to (in, to, on, etc.) the original. Accordingly, it should be appreciated that an original not preliminarily added with identification information cannot be applied with this method.

On the other hand, there has also been a method for preventing illegal copying by using paper fingerprint information of paper as individual paper identification information. Paper is made by entanglement of fine natural fibers, and a degree of the entanglement is random, so that a possibility of existence of pieces of paper having the completely same paper fiber pattern is supposed to be extremely low. Accordingly, the paper fiber pattern can be treated as the paper fingerprint information. The paper fingerprint information has a different characteristic for each sheet of paper, similar to a human fingerprint. As a result, if the paper fingerprint information is used as the individual identification information, it becomes unnecessary to add the identification information to an original with the use of means such as a digital watermark. Also, the paper fiber pattern is not deformed even by being bent to some extent, i.e., it is high in durability, and it changes little with time, so that the paper fingerprint information can be used as the individual identification information for a long term.

In the above method for preventing illegal copying based on the paper fingerprint information, when the paper fingerprint information of the paper is scanned with a scanner, it is necessary to scan the paper with the amount of light for scanning being smaller than that for scanning an image on the paper. That is, when the paper fingerprint information is scanned with the scanner, brightness of a light source should be lower than normal. Accordingly, in the method for preventing illegal copying based on the paper fingerprint information, the scanning operation for the image and that for the paper fingerprint information should be performed separately upon copying of an original, so that there arises a problem of reduction in copying efficiency.

SUMMARY OF THE INVENTION

An object of the present invention is to improve the copying efficiency by making unnecessary the scanning operation for an image of an original upon second or later copying of the original in the method for preventing illegal copying based on the paper fingerprint information.

The present invention provides an image forming device. In one aspect, an image forming device scans original image data from an original and scans paper fingerprint information from the original. The image forming device associates the original image data and the paper fingerprint information with each other to register in an information processing device. The image forming device transmits paper fingerprint information scanned from an original with the amount of light being smaller than that for usual scanning to the information processing device, and requests the information processing device to determine whether or not the paper fingerprint information has been registered. The image forming device, upon receipt of a result of the determination from the information processing device that the paper fingerprint information has been registered, retrieves from the information processing device the original image data registered in association with the paper fingerprint information to apply image processing, or upon receipt of a result of the determination from the information processing device that the paper fingerprint information has not been registered, applies the image processing to original image data scanned from the original with the amount of light for usual scanning. The image forming device prints out the image-processed original image data.

In another aspect, an image forming device scans original image data from an original and scans paper fingerprint information from the original. The image forming device stores the original image data and the paper fingerprint information in a storage. The image forming device associates the original image data and the paper fingerprint information with each other to register them in the storage. The image forming device determines whether or not paper fingerprint information scanned from an original with the amount of light being smaller than that for usual scanning has been registered. The image forming device, upon the component for determining outputting a result of the determination that the paper fingerprint information has been registered, applies image processing to the original image data registered in association with the paper fingerprint information, or upon the component for determining outputting a result of the determination that the paper fingerprint information has not been registered, applies the image processing to original image data scanned from the original with the amount of light for usual scanning. The image forming device prints out the image-processed original image data.

In another aspect, an image forming device scans a plurality of pieces of original image data from an original comprising a plurality of pages. The image forming device forms the plurality of pieces of original image data on a sheet of output paper. The image forming device scans paper fingerprint information from the output paper. The image forming device associates the plurality of pieces of original image data and the paper fingerprint information with each other to register them in an information processing device. The image forming device transmits paper fingerprint information scanned from an original to the information processing device, and requests the information processing device to determine whether or not the paper fingerprint information has been registered. The image forming device, upon receipt of a result of the determination from the information processing device that the paper fingerprint information has been registered, retrieves from the information processing device the plurality of pieces of original image data registered in association with the paper fingerprint information to apply image processing, or upon receipt of a result of the determination from the information processing device that the paper fingerprint information has not been registered, applies the image processing to original image data scanned from the original. The image forming device prints out the image-processed original image data.

In another aspect, an image forming device scans a URL for a Web page from an original printed with the URL and scans paper fingerprint information from the original. The image forming device associates the URL and the paper fingerprint information with each other to register them in a first information processing device. The image forming device transmits paper fingerprint information scanned from an original to the first information processing device, and requests the first information processing device to determine whether or not the paper fingerprint information has been registered. The image forming device, upon receipt of a result of the determination from the first information processing device that the paper fingerprint information has been registered, retrieves from the first information processing device the URL registered in association with the paper fingerprint information, and downloads the Web page indicated by the URL from a second information processing device to apply image processing, or upon receipt of a result of the determination from the first information processing device that the paper fingerprint information has not been registered, applies the image processing to original image data scanned from the original. The image forming device prints out the image-processed original image data.

In another aspect, an image forming device scans original image data from an original. The image forming device forms on a plurality of sheets of output paper image data generated by synthesizing the original image data and a plurality of pieces of variable data. The image forming device scans respective pieces of paper fingerprint information from the plurality of sheets of output paper to acquire the plurality of pieces of paper fingerprint information. The image forming device associates the plurality of pieces of variable data and the plurality of pieces of paper fingerprint information, respectively, to register them in an information processing device. The image forming device transmits paper fingerprint information scanned from an original to the information processing device, and requests the information processing device to determine whether or not the paper fingerprint information has been registered. The image forming device, upon receipt of a result of the determination from the information processing device that the paper fingerprint information has been registered, retrieves from the information processing device the variable data registered in association with the paper fingerprint information to print out it.

Further features of the present invention will become apparent from the following description of exemplary embodiments (with reference to the attached drawings).

DESCRIPTION OF THE EMBODIMENTS

Examples of a configuration and operation of a system applicable with the present invention are described with reference to the drawings.

Figure 1:
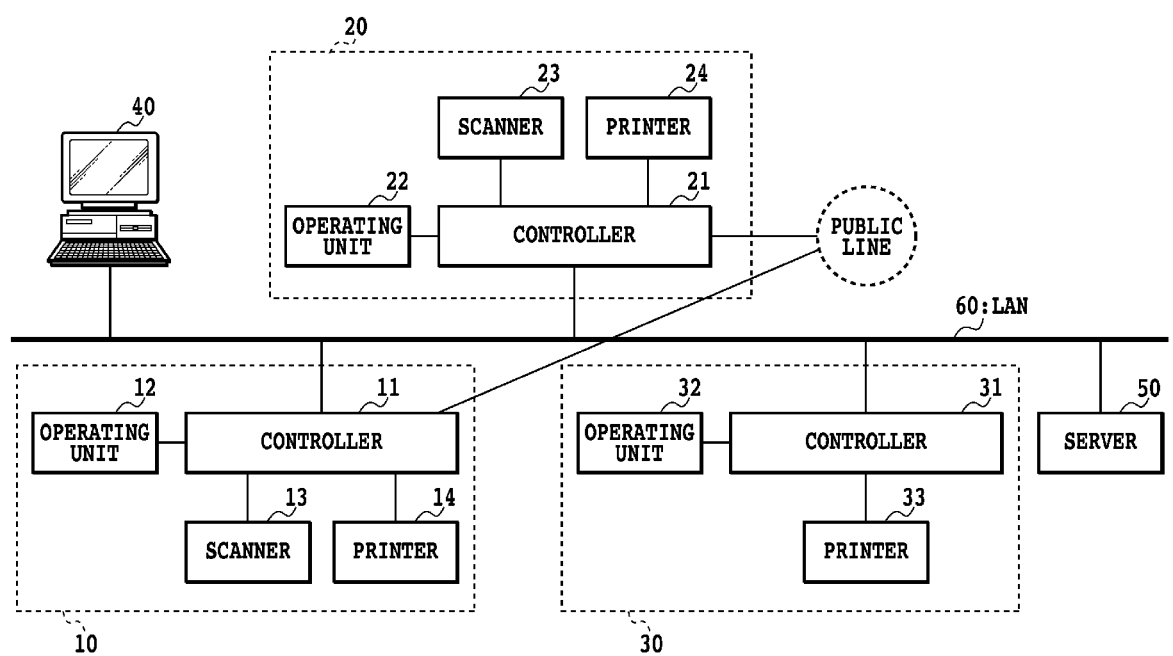
FIG. 1 is a block diagram illustrating an example of a configuration of a system applicable with the present invention.

FIG. 1 is a block diagram illustrating the example of a configuration of the system applicable with the present invention.

The system comprises one host computer (hereinafter referred to as a "PC") 40, three image forming devices 10, 20, and 30, and a server 50 that is an information processing device. Respective devices communicate with one another via a LAN 60.

Note that types and the number of devices connected to the LAN 60 are not limited to those in this example. Also, a communication system among the respective devices is not limited to the LAN, but may be a communication system such as a WAN (public line), serial transmission system such as USB, or parallel transmission system such as Centronics or SCSI.

The PC 40 performs file transfer based on an FTP or SMB protocol, or transmits/receives an electronic mail to/from the other devices via the LAN 60 or WAN. Also, the PC 40 uses a printer driver installed therein to issue a print instruction to the image forming device 10, 20, or 30.

The image forming device 10 comprises an operating unit 12, scanner 13, printer 14, and controller 11. Also, the image forming device 20 comprises an operating unit 22, scanner 23, printer 24, and controller 21. Further, the image forming device 30 comprises an operating unit 32, controller 31, and printer 33. The image forming device 30 is different from the other image forming devices in that it is not provided with a scanner.

The operating unit 12, 22, or 32 comprises a user interface screen for inputting a print instruction or the like from a user and presenting a print status or the like to the user. Also, the scanner 13 or 23 converts an image printed on an original into scanned image data. Further, the printer 14, 24, or 33 forms the image data on paper. Still further, the controller 11, 21, or 31 totally controls an operation of the corresponding image forming device.

The server 50 registers paper fingerprint information sent from the image forming device 10 or 20 and image data associated with the paper fingerprint information, as well as checking paper fingerprint information newly sent against that having already been registered. The server 50 determines based on this whether or not the newly sent paper fingerprint information has already been registered in the server 50. If the newly sent paper fingerprint information has already been registered in the server 50, the image data associated with the paper fingerprint information is transmitted to the image forming device 10 or 20. Details of the corresponding processing will be described later.

Note that a device in which the paper fingerprint information and the associated image data are registered may be a storage device incorporated in the image forming device. In such a case, the image forming device itself performs the checking, or the like, of the paper fingerprint information.

Next, the image forming device 10 is taken as an example to describe examples of a configuration and operation of the image forming device with reference to the drawings.

Figure 2:
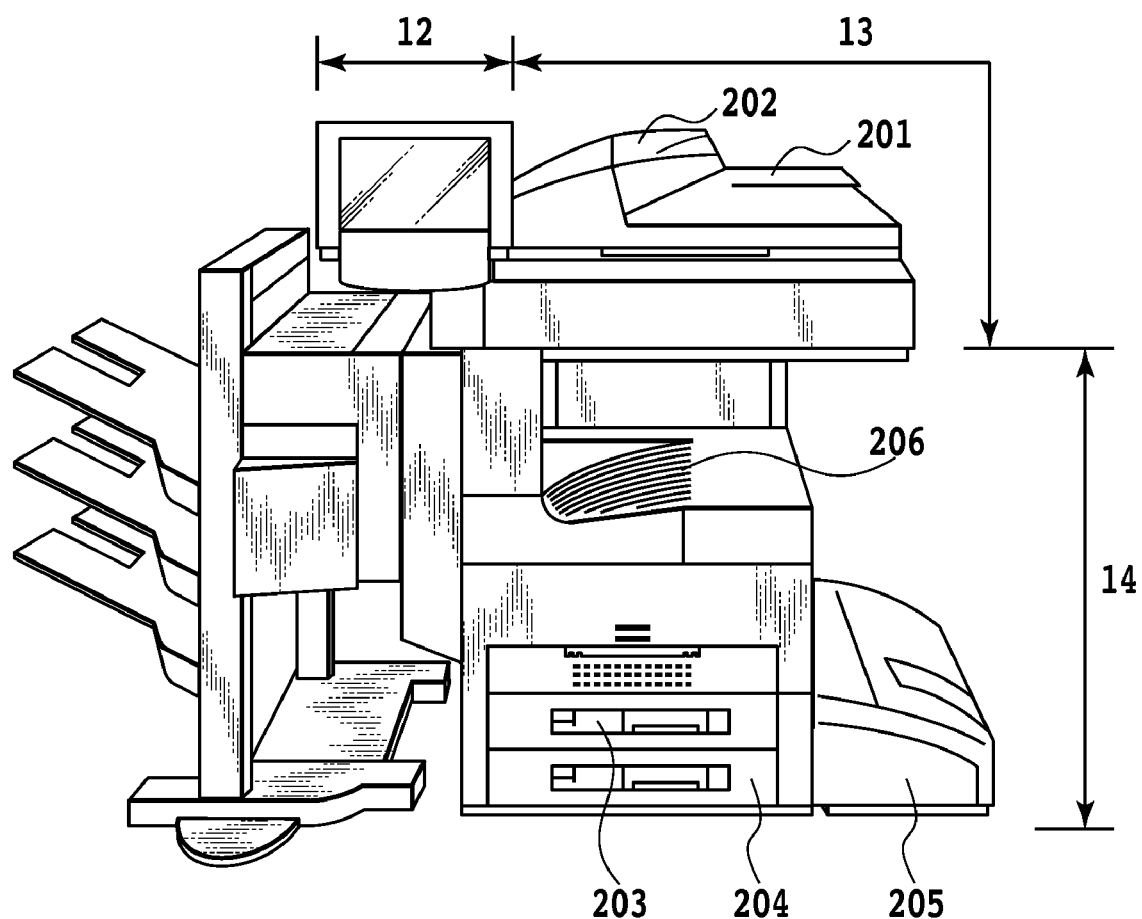
FIG. 2 is an appearance diagram of an image forming device.

FIG. 2 is an appearance diagram of the image forming device 10.

The image forming device 10 comprises a feeder 201, tray 202, and paper cassettes 203, 204, and 205, as well as the operating unit 12, scanner 13, and printer 14.

The scanner 13 has a plurality of CCDs. If each of the CCDs has different sensitivity, pixels on the original are recognized as respectively having different densities even if they have the same density. Therefore, the scanner 13 performs scanning exposure of a white plate (uniformly white plate), and converts reflected light detected by the respective CCDs on the basis of the scanning exposure into electrical signals to output them to the controller 11. A shading correction unit (described later) in the controller 11 recognizes differences in sensitivity among the CCDs on the basis of the electrical signals obtained by the respective CCDs. Then, the recognized differences in sensitivity among the CCDs are used to correct values of electrical signals obtained by scanning the image on the original. Further, upon receipt of gain adjustment information from a CPU in the controller 11, the shading correction unit performs gain adjustment on the basis of the information. The gain adjustment is used to adjust how each of the electrical signals obtained by the scanning exposure of the original is assigned to any of brightness signal values of 0 to 255. The shading correction unit performs the gain adjustment to thereby convert each of the electrical signals obtained by the scanning exposure of the original into either a high or low brightness signal value.

Next, how the scanner 13 scans the image on the original is described.

The scanner 13 is a device that inputs reflected light obtained by the scanning exposure of the image on the original to the CCDs to convert optical signals into the electrical signals; then converts the electrical signals into RGB brightness signals; and outputs the brightness signals to the controller as the image data.

When the user sets the original on the tray 202 of the feeder 201, and then instructs from the operating unit 12 to start scanning, the controller 11 sends an original scanning instruction to the scanner 13.

Upon receipt of the original scanning instruction, the scanner 13 scans the original while the feeder 201 feeds the original from the tray 202 on a sheet-by-sheet basis. Note that an original scanning system is not an automatic feeding system by the feeder 201 but may be a system in which the original is placed on a glass surface (not shown), and then scanned while an exposure unit is moved.

The printer 14 forms on the paper the image data received from the controller 11. Note that an image forming system in this embodiment is an electrophotographic system using a photosensitive drum or belt; however, it is not limited to this. For example, it may be an inkjet system in which ink is discharged from a micro nozzle array to print characters on paper.

The paper cassettes 203, 204, and 205 can accommodate different paper sizes (A4, B4, etc.) or different paper orientations (longitudinally, laterally). To a catch tray 206, the paper having been printed thereon is discharged.

Next, an example of a configuration of the controller 11 in the image forming device 10 is described with reference to the drawings.

Figure 3:
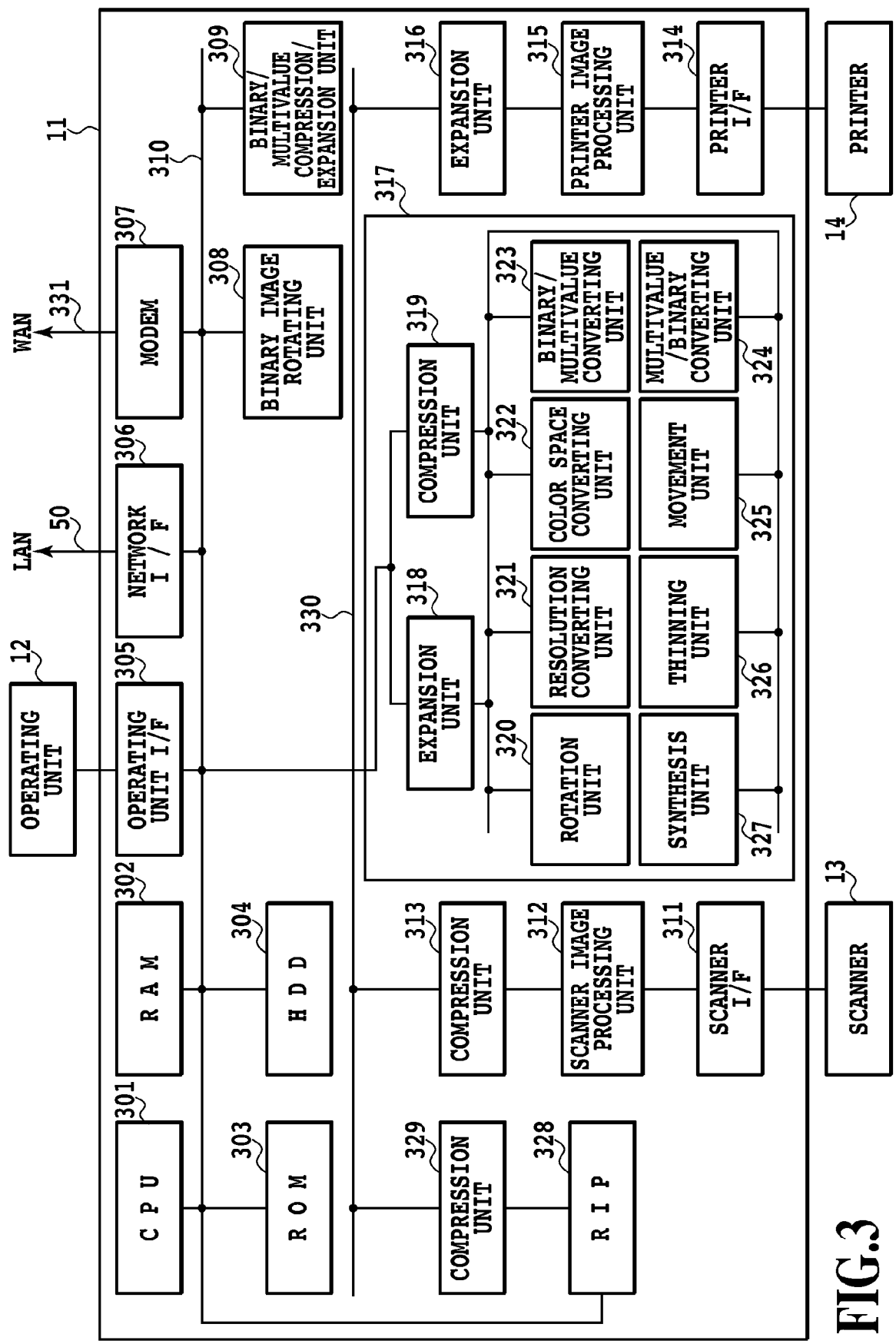
FIG. 3 is a block diagram illustrating an example of a configuration of a controller in the image forming device.

FIG. 3 is a block diagram illustrating the example of a configuration of the controller 11.

A CPU 301 integrally controls input/output among the respective devices in connection on the basis of a control program or the like stored in a ROM 303, as well as integrally controlling various types of processing performed in the controller.

A RAM 302 is a system work memory used by the CPU 301, and also a memory for temporarily storing the image data.

The ROM 303 stores a boot program, and the like, for the image forming device.

An HDD 304 is a hard disk drive, and stores system software and the image data.

An operating unit I/F 305 is an interface for establishing a connection between a system bus 310 and the operating unit 12. The operating unit I/F 305 receives the image data to be displayed on the operating unit 12 from the system bus 310 to output it to the operating unit 12, and also outputs to the system bus 310 information inputted from the operating unit 12.

A Network I/F 306 is an interface for establishing a connection between the LAN 60 and the system bus 310.

A Modem 307 is an interface for establishing a connection between a WAN 331 and the system bus 310.

A binary image rotating unit 308 converts an orientation of the image data prior to transmission.

A binary/multivalue image compression/expansion unit 309 performs compression/expansion to convert a resolution of the image data prior to transmission into a predetermined resolution or a resolution suitable for a processing capacity of the other device. For the compression and expansion, a system such as JBIG, MMR, MR, or MH is used. An image bus 330 is a transmission path for transferring the image data, and configured with the use of a PCI bus or IEEE 1394.

A scanner image processing unit 312 corrects, processes, and edits the image data received from the scanner 13 via a scanner I/F 311. Also, the scanner image processing unit 312 determines whether the received image data corresponds to a color or monochrome original, or a character or photographic original, or the like. Then, the scanner image processing unit 312 attaches a result of the determination to the image data. Such attached information is referred to as attribute data. Details of the processing performed by the scanner image processing unit 312 will be described later.

Figure 4:
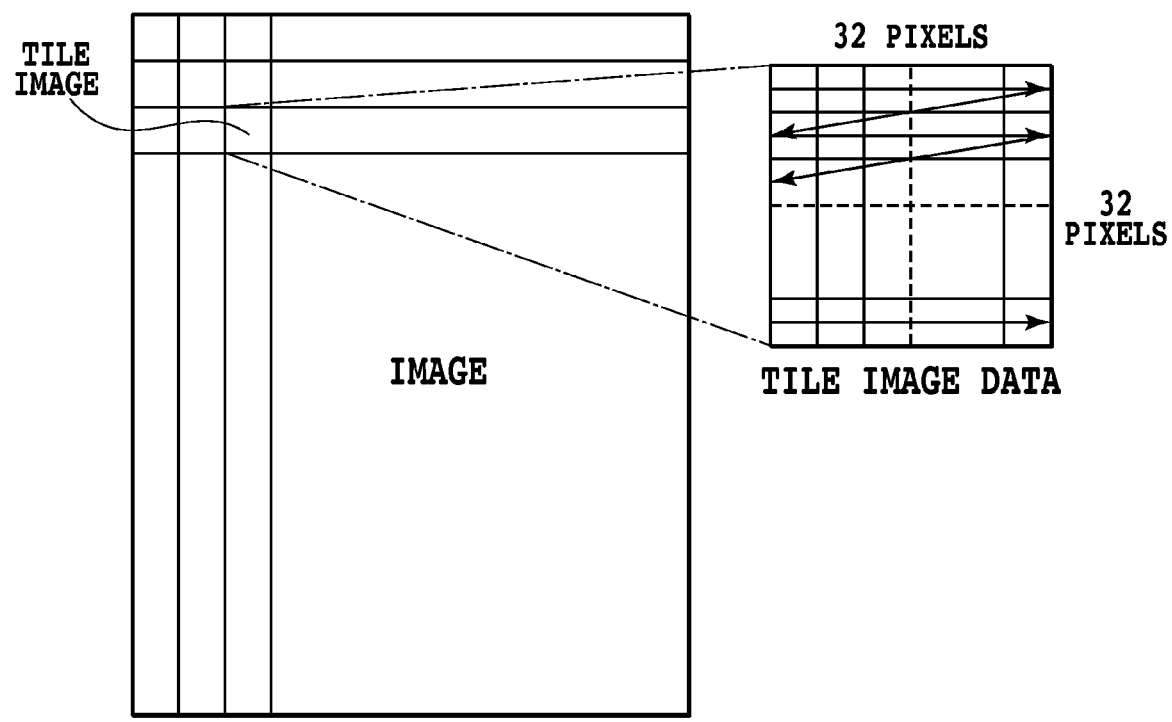
FIG. 4 is a diagram conceptually illustrating tile image data.

A compression unit 313 receives the image data from the image bus 330, and divides it on a 32×32 pixel block basis. In addition, the one block image data substantially consisting of the 32×32 pixels is referred to as tile image data. FIG. 4 is a diagram conceptually illustrating the tile image data. One tile image includes the tile image data substantially consisting of the 32×32 pixels. Also, the tile image data is added as header information with average brightness information on one block and a position of the corresponding tile image in the original. Further, the compression unit 313 performs compression processing of image data substantially consisting of a plurality of pieces of tile image data.

An expansion unit 316 receives the compressed image data substantially consisting of the plurality of pieces of tile image data; expands it followed by a raster development of it; and then sends it to a printer image processing unit 315.

The printer image processing unit 315 performs image processing of the received image data with reference to the attribute data attached to the image data, and then sends the processed data to a printer I/F 314. Details of the processing performed by the printer image processing unit 315 will be described later.

The printer I/F 314 sends to the printer 14 the received image data having been subjected to the image processing.

An image converting unit 317 performs predetermined conversion processing of the image data. The image converting unit 317 comprises an expansion unit 318, compression unit 319, rotation unit 320, resolution converting unit 321, color space converting unit 322, binary/multivalue converting unit 323, synthesis unit 327, thinning unit 326, movement unit 325, and multivalue/binary converting unit 324.

The expansion unit 318 expands the image data received from the image bus 330.

The compression unit 319 compresses the image data received from the image bus 330.

The rotation unit 320 rotates the image data received from the expansion unit 318 or compression unit 319.

The resolution converting unit 321 performs resolution conversion processing (e.g., conversion from 600 dpi to 200 dpi) of the image data received from the expansion unit 318 or compression unit 319.

The color space converting unit 322 converts a color space of the image data received from the expansion unit 318 or compression unit 319. The color space converting unit 322 performs publicly known background removal processing with the use of a matrix or table, or publicly known LOG converting processing (RGB→CMY), or publicly known output color correcting processing (CMY→CMYK).

The binary/multivalue converting unit 323 converts 2-gradation image data received from the expansion unit 318 or compression unit 319 into 256-gradation image data.

The multivalue/binary converting unit 324 converts 256-gradation image data received from the expansion unit 318 or compression unit 319 into 2-gradation image data with the use of a method such as error diffusion processing.

The synthesis unit 327 synthesizes two pieces of image data received from the expansion unit 318 or compression unit 319 to generate image data for a sheet of paper. Note that for the synthesis of the two pieces of image data, a method in which an average of brightness values of pixels to be synthesized is adapted to be a synthesized brightness value, or a method in which a brightness value of a pixel higher than that of the other pixel is adapted to be a brightness value of the synthesized pixel is applied. Alternatively, a method in which a pixel darker than the other pixel is adapted to be the synthesized pixel may be used. Further, a method for determining the synthesized brightness value by an OR, AND, exclusive OR, or other operation of pixels to be synthesized may be applied. These synthesis methods are all well known.

The thinning unit 326 thins pixels of the image data received from the expansion unit 318 or compression unit 319 to convert a resolution, and generates ½, ¼, ⅛, or other scale image data.

The movement unit 325 adds/deletes a margin to/from the image data received from the expansion unit 318 or compression unit 319.

A RIP 328 receives intermediate data generated on the basis of PDL code data transmitted from the PC 40 or the like, and then generates bitmap data (multivalue).

Next, an example of a configuration of the scanner image processing unit 312 is described with reference to the drawings.

Figure 5:
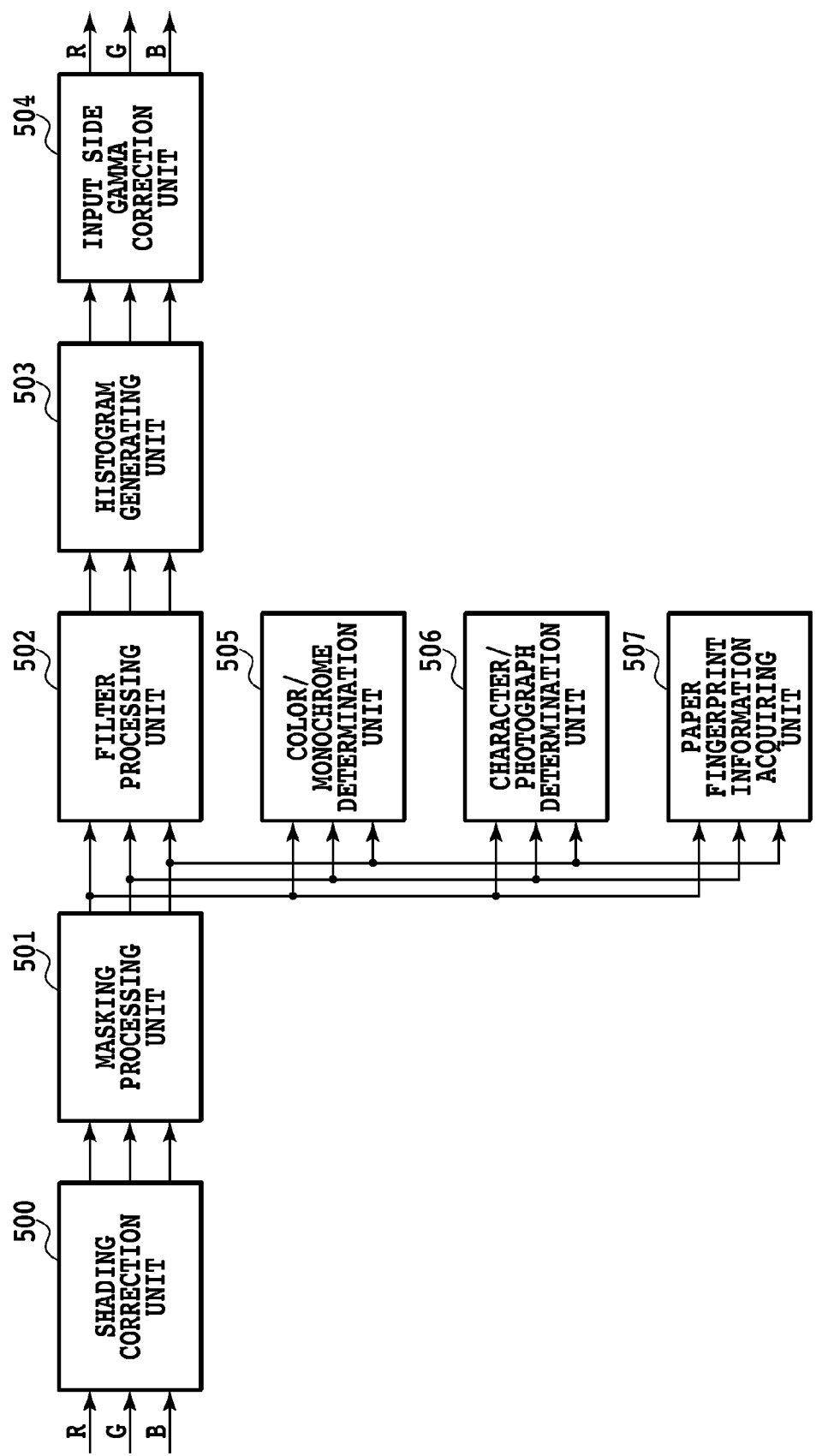
FIG. 5 is a block diagram illustrating an example of a configuration of a scanner image processing unit in the image forming device.

FIG. 5 is a block diagram illustrating the example of a configuration of the scanner image processing unit 312.

The scanner image processing unit 312 comprises a shading correction unit 500, masking processing unit 501, filter processing unit 502, color/monochrome determination unit 505, character/photograph determination unit 506, paper fingerprint information acquiring unit 507, histogram generating unit 503, and input side gamma correction unit 504.

The scanner image processing unit 312 receives from the scanner I/F 311 the image data substantially consisting of the RGB brightness signals.

The shading correction unit 500 makes shading corrections of the brightness signals. The shading correction is a process for preventing false recognition of brightness of the original due to variation in sensitivity of CCD. Also, the shading correction unit 500 performs the gain adjustment in accordance with the instruction from the CPU 301.

The masking processing unit 501 converts the corrected brightness signals into standard brightness signals independent of filter color of the CCDs.

The filter processing unit 502 arbitrarily corrects a spatial frequency of the received image data. For example, the filter processing unit 502 performs arithmetic processing of the received image data with the use of a 7×7 matrix. On the other hand, in a MultiFunction Peripheral (MFP), the user can select any of a character mode, photograph mode, or character/photograph mode, as a copy mode. If the character mode is selected, the filter processing unit 502 filters the entire image data with the use of a filter for characters. Also, if the photograph mode is selected, the filter processing unit 502 filters the entire image data with the use of a filter for photographs. Further, if the character/photograph mode is selected, the filter processing unit 502 adaptively switches between the filters on a pixel-by-pixel basis in accordance with a character/photograph determination signal (part of the attribute data). That is, it is determined on the pixel-by-pixel basis whether the filter for photographs or characters is applied. Note that for the filter for photographs, a factor for only smoothing a high frequency component is set. This is for obscuring surface roughness of the image. Also, for the filter for characters, a factor for enhancing edge reinforcement is set. This is for enhancing sharpness of characters.

The histogram generating unit 503 samples brightness data on the pixels from the image data received from the filter processing unit 502. Specifically, the histogram generating unit 503 samples the brightness data within a rectangular area surrounded by lines formed by two sets of start and end points respectively specified in main scanning and sub-scanning directions, at constant pitches in the main scanning and sub-scanning directions. Subsequently, the histogram generating unit 503 generates histogram data on the basis of a result of the sampling. The generated histogram data is used for estimating a background level when background removal processing is performed.

The input side gamma correction unit 504 uses a table or the like to convert the histogram data received from the histogram generating unit 503 into brightness data having a nonlinear characteristic.

The color/monochrome determination unit 505 determines whether the respective pixels constituting the image data are chromatic or achromatic, and attaches a result of the determination to the image data as a color/monochrome determination signal (part of the attribute data).

On the basis of a pixel value of each of the pixels constituting the image data and pixel values of pixels peripheral to the each of the pixels, the character/photograph determination unit 506 determines whether the each of the pixels is a pixel constituting a character, dot, character in dots, or solid image. Also, the character/photograph determination unit 506 determines that a pixel not corresponding any of the above pixels is a pixel constituting a white area, and attaches a result of the determination to the image data as the character/photograph determination signal (part of the attribute data).

The paper fingerprint information acquiring unit 507 performs the operations described below.

Figure 8:
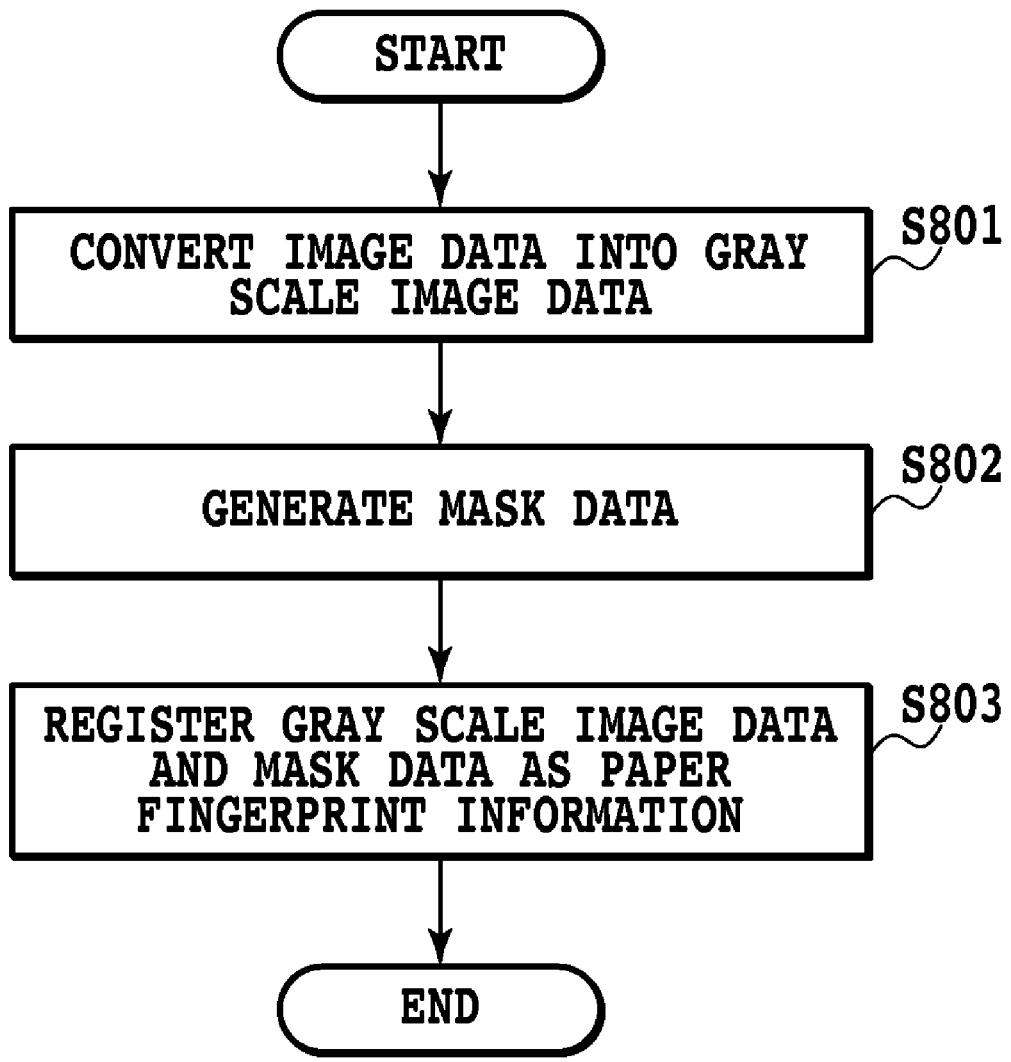
FIG. 8 is a flowchart for paper fingerprint information acquisition processing performed by a paper fingerprint information acquiring unit in the image forming device.

FIG. 8 is a flowchart illustrating an example of paper fingerprint information acquisition processing performed by a paper fingerprint information acquiring unit 507.

In Step 801, the paper fingerprint information acquiring unit 507 converts the image data into gray scale image data.

In Step 802, the paper fingerprint information acquiring unit 507 generates mask data for eliminating from the image anything possibly causing an erroneous determination, such as a printed or handwritten character. The mask data is binary data, "0" or "1". The paper fingerprint information acquiring unit 507 generates the mask data of "1" for a pixel from which the brightness signal value is equal to or more than a first threshold in the gray scale image data. On the other hand, the paper fingerprint information acquiring unit 507 generates the mask data of "0" for a pixel from which the brightness signal value is less than the first threshold. That is, the paper fingerprint information acquiring unit 507 generates the mask data of "1" for a bright pixel, and "0" for a dark pixel (pixel constituting a printed character, or the like). The paper fingerprint information acquiring unit 507 performs the processing for generating the mask data on a pixel-by-pixel basis.

In Step 803, the paper fingerprint information acquiring unit 507 stores in the RAM 302 the image data converted into the gray scale in Step 801, and the mask data generated in Step 802, as the paper fingerprint information.

The CPU 301 retrieves the paper fingerprint information of the predetermined area stored in the RAM 302 by the paper fingerprint information acquiring unit 507, and encodes the paper fingerprint information to generate encoded image data. An encoded image refers to a two-dimensionally encoded image, or barcode image. Subsequently, the CPU 301 outputs the encoded image data generated to an encoded image synthesizing unit in the printer image processing unit 315 via a data bus.

Figure 6:
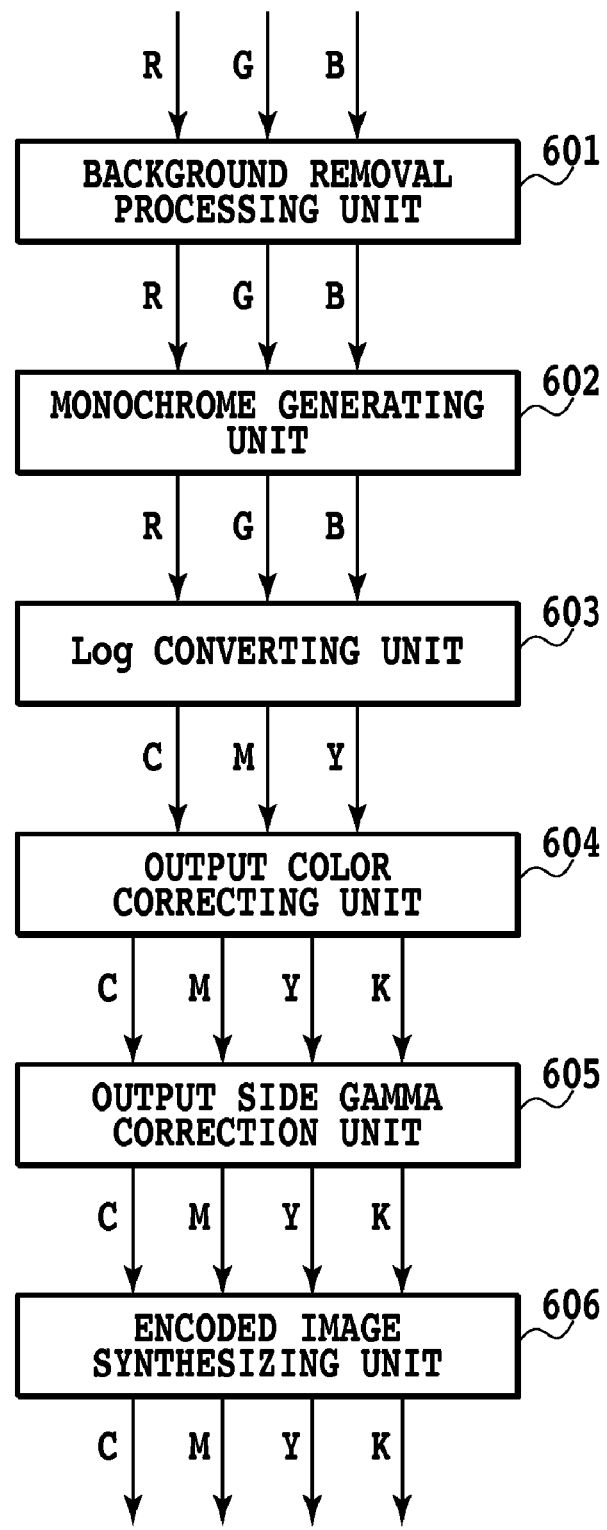
FIG. 6 is a diagram illustrating a processing flow performed by a printer image processing unit in the image forming device.

On the other hand, FIG. 6 is a diagram illustrating a processing flow performed by the printer image processing unit 315.

A background removal processing unit 601 removes background color in the image data with the use of the histogram generated by the scanner image processing unit 312 (background removal).

A monochrome generating unit 602 converts color data into monochrome data.

A Log converting unit 603 performs brightness/density conversion. The Log converting unit 603 converts, for example, RGB image data into CMY image data.

An output color correcting unit 604 performs output color conversion. The output color correcting unit 604 converts, for example, CMY image data into CMYK image data with the use of a table or matrix.

An output side gamma correction unit 605 performs correction such that a signal value inputted to the output side gamma correction unit 605 is proportional to a reflected density value subsequent to copy output.

The encoded image synthesizing unit 606 synthesizes the image data corrected by the output side gamma correction unit 605 and the encoded image data generated by encoding the above-described paper fingerprint information.

Next, the paper fingerprint information checking processing performed by the server 40 is described with the reference to the drawings.

The CPU 301 in the image forming device 10 retrieves paper fingerprint information (paper fingerprint information newly acquired this time) stored in the RAM 302 by the paper fingerprint information acquiring unit 507, and then transmits it to the server 40. The server 40 checks the received "paper fingerprint information" against the "other paper fingerprint information". Note that the "other paper fingerprint information" referred to paper fingerprint information registered in the server 40. In the following description, the paper fingerprint information newly acquired this time is referred to as the "paper fingerprint information", and the paper fingerprint information registered in the server 40 is referred to as the "other paper fingerprint information".

Figure 9:
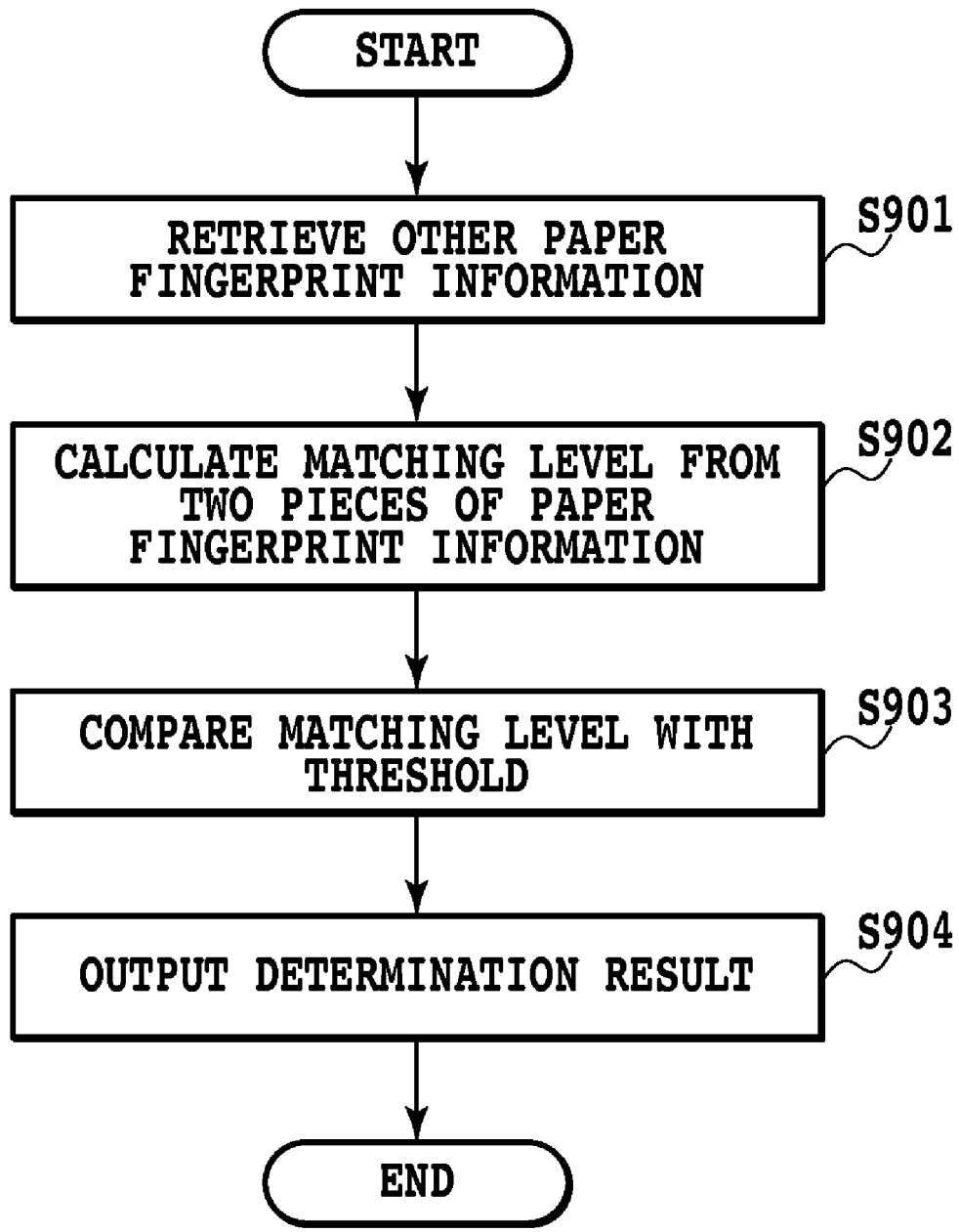
FIG. 9 is a flowchart for paper fingerprint information checking processing performed by a server.

FIG. 9 is a flowchart illustrating the paper fingerprint information checking processing performed by the server 40.

In Step 901, upon receipt of the "paper fingerprint information" sent from the image forming device 10, the server 40 retrieves the "other paper fingerprint information" from a storage device.

In Step 902, the server 40 checks the two pieces of paper fingerprint information against each other to calculate a matching level therebetween. Upon the checking, the "paper fingerprint information" and the "other paper fingerprint information" may be acquired from different positions respectively, so that displacement correction (correction for a shift in position) is first performed. An algorithm for the paper fingerprint information checking processing will be described later.

In Step 903, the matching level between the two pieces of paper fingerprint information is compared with a predetermined threshold, and in Step 904, a result of determination whether or not the both coincide with each other is outputted.

Next, processing performed by the image forming device 10 to register the paper fingerprint information and the corresponding image data in the server 40 is described. Also, the description is given with reference to processing in which the server 40 having received the paper fingerprint information performs the paper fingerprint information checking processing, and if the paper fingerprint information coincide with the other one, transmits to the image forming device 10 image data registered for the paper fingerprint information.

Figure 7:
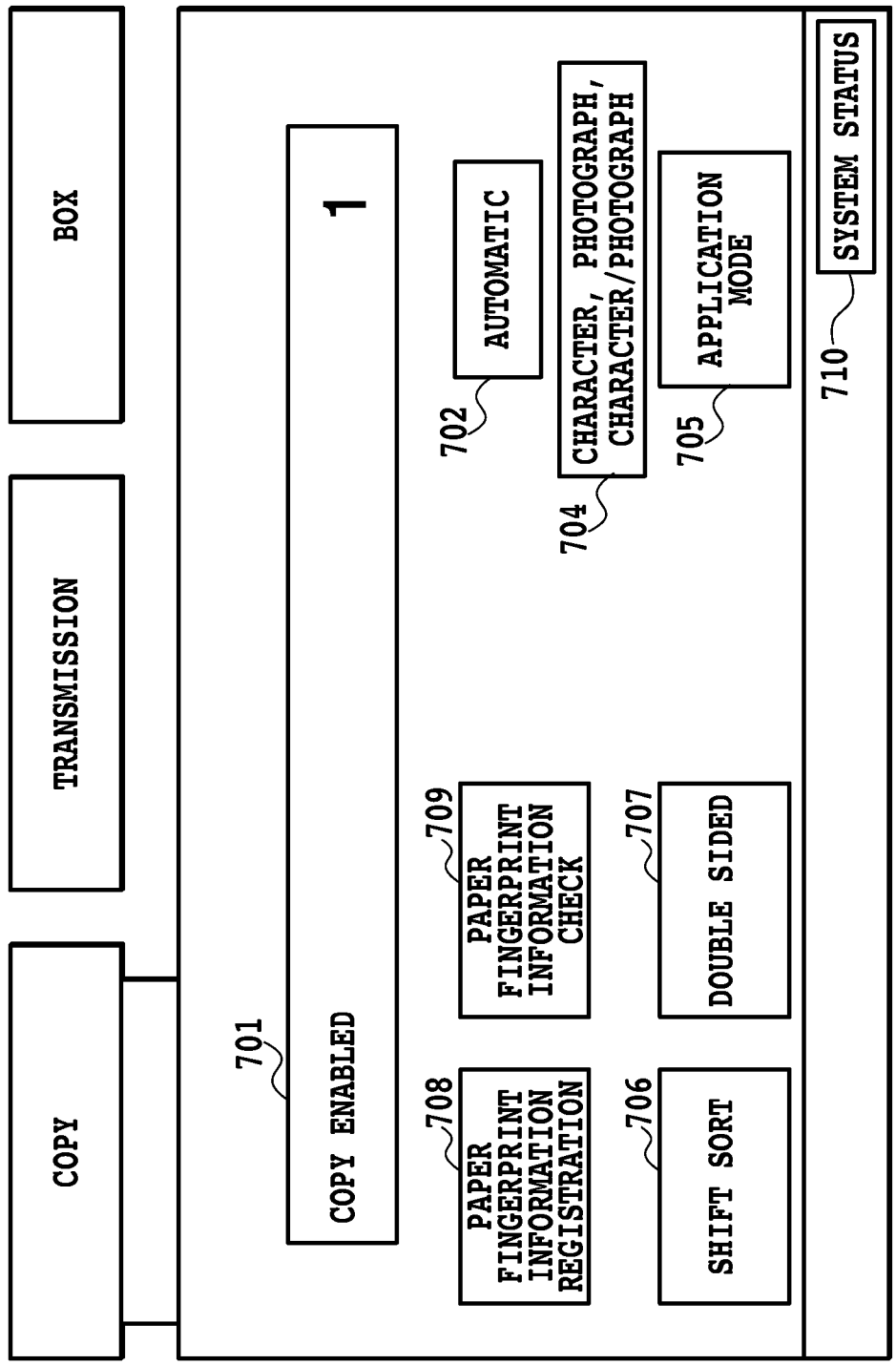
FIG. 7 is a diagram illustrating an operating screen presented to a user by an operating unit in the image forming device.

FIG. 7 is a diagram illustrating an operating screen presented to the user by the operating unit 12 of the image forming device 10.

Reference numeral 701 represents a tab for presenting whether or not the image forming device is in a copiable status, and also the number of copies.

Reference numeral 704 represents a tab for selecting a type of an original to be copied. By operating the tab, any mode is selected from the character mode, photograph mode, or character/photograph mode.

Reference numeral 706 represents a tab for making a setting pertaining to various types of finishing.

Reference numeral 707 represents a tab for setting double-sided scanning and double-sided printing.

Reference numeral 702 is a tab for selecting an original scanning mode. By operating the tab, any mode is selected from a color mode, black mode, or automatic (ACS) mode. If the color mode is selected, color copying is performed, whereas if the black mode is selected, monochrome copying is performed. Also, if the automatic mode is selected, the copy mode is determined on the basis of the color/monochrome determination signal.

Reference numeral 708 represents a tab for performing processing for registering the paper fingerprint information in the server 40.

Reference numeral 709 represents a tab for performing the processing for checking the paper fingerprint information registered in the server 40 ("other paper fingerprint information" and that of the original to be copied ("paper fingerprint information") against each other.

<Paper Fingerprint Information Registration Processing>

The paper fingerprint information registration processing activated by the user pressing down the "708" is described with reference to the drawings.

Figure 10:
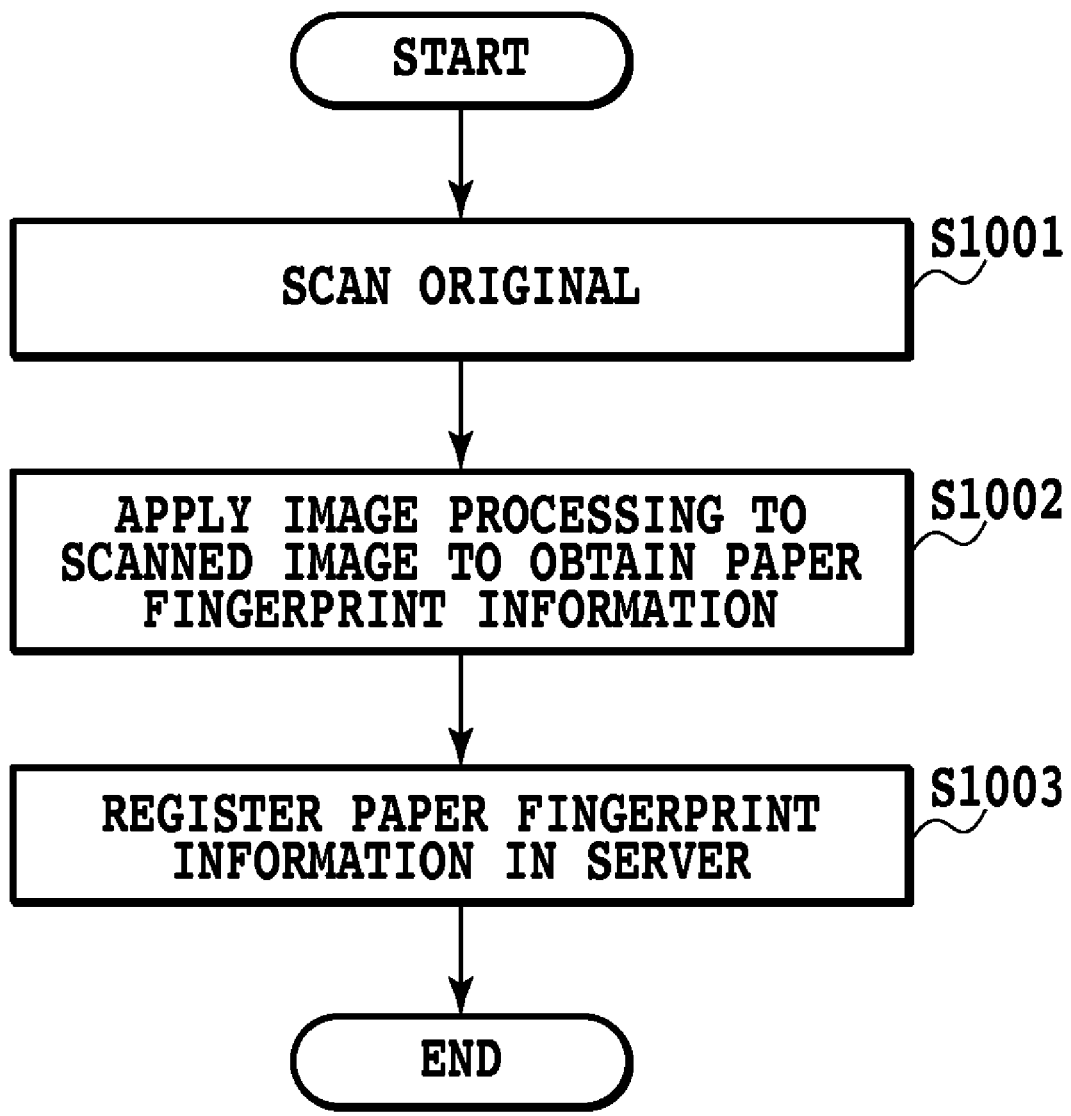
FIG. 10 is a flowchart for paper fingerprint information registration processing.

FIG. 10 is a flowchart illustrating an example of the paper fingerprint information registration processing.

In Step 1001, the CPU 301 of the image forming device 10 sends the original scanned by the scanner 13 to the scanner image processing unit 312 as the image data.

In Step 1002, the scanner image processing unit 312 sets a typical gain adjustment value for the shading correction unit 500, and then generates attribute data along with new image data. The attribute data indicates whether each of separate image areas obtained by separating the scanned original into a plurality of image areas is a character area or a photograph area, and indicates whether the original is a color original or a monochrome original. Also, the scanner image processing unit 312 sets for the shading correction unit 500 another gain adjustment value smaller than the above typical gain adjustment value. Then, the scanner image processing unit 312 outputs to the paper fingerprint information acquiring unit 507 respective brightness signal values obtained by applying the above smaller gain adjustment value to the image data obtained by re-scanning. Subsequently, the paper fingerprint information acquiring unit 507 acquires paper fingerprint information on the basis of the brightness values.

In Step 1003, the image forming device 10 sends the paper fingerprint information and the corresponding image data to the server 40, and requests the server 40 to register them.

Note that a device in which the paper fingerprint information and the image data are registered may be one, such as the HDD 304, incorporated in the image forming device.

<Paper Fingerprint Information Checking Processing>

The paper fingerprint information checking processing activated by the user pressing down the tab "709" is described with reference to the drawings.

Figure 11:
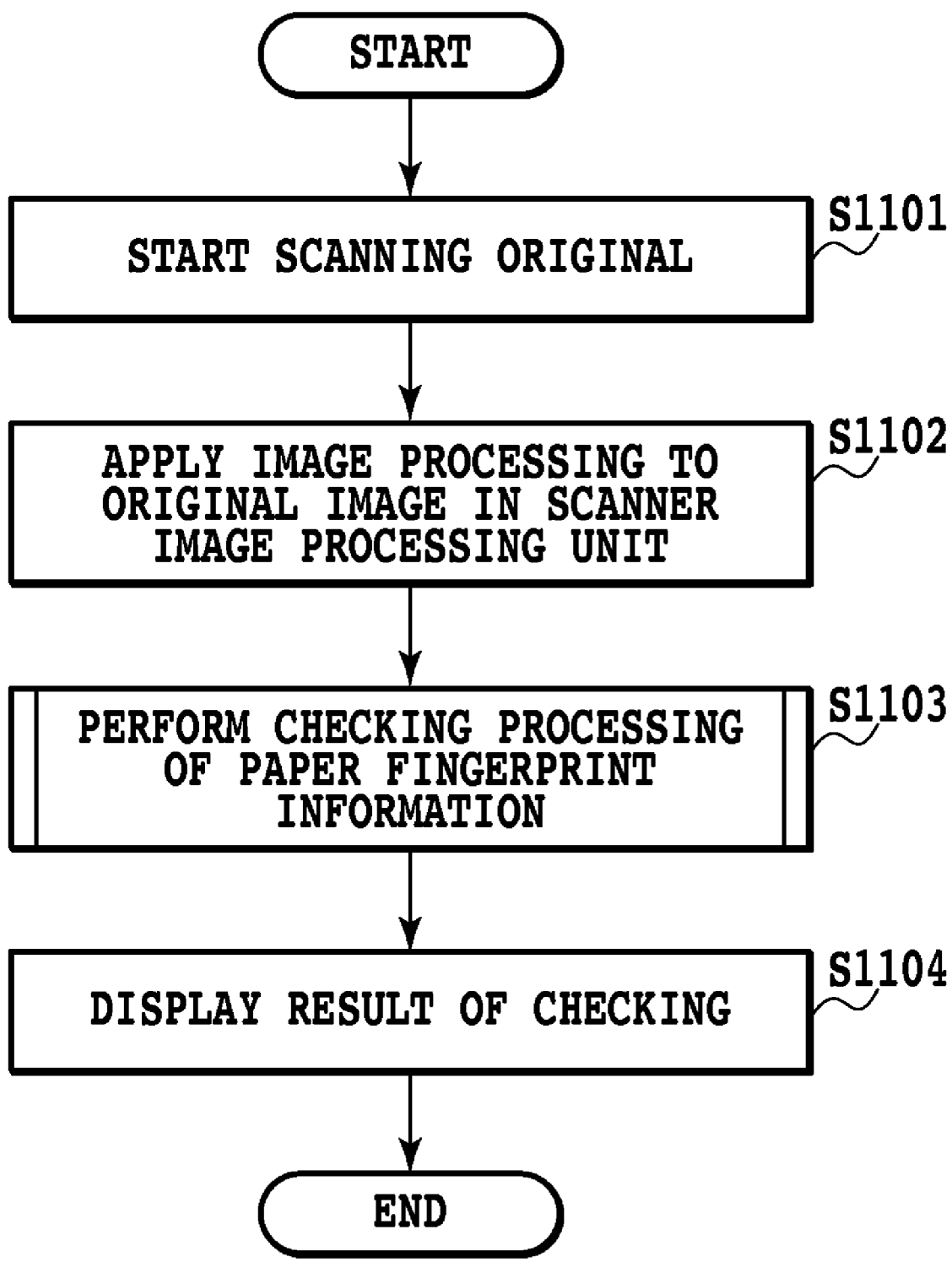
FIG. 11 is a flowchart for the paper fingerprint information checking processing.

FIG. 11 is a flowchart illustrating an example of the paper fingerprint information checking processing.

In Step 1101, the CPU 301 sends the original scanned by the scanner 13 to the scanner image processing unit 312 as the image data.

In Step 1102, the scanner image processing unit 312 sets a typical gain adjustment value for the shading correction unit 500; then generates attribute data along with new image data for the image data; and attaches the attribute data to the image data. Also in Step 1102, a gain adjustment value smaller than the above typical gain adjustment value is set for the shading correction unit 500. Then, the scanner image processing unit 312 outputs to the paper fingerprint information acquiring unit 507 respective brightness signal values obtained by applying the above smaller gain adjustment value to the image data. Subsequently, the paper fingerprint information acquiring unit 507 acquires paper fingerprint information on the basis of the brightness values. After that, the paper fingerprint information acquiring unit 507 stores the acquired paper fingerprint information in the RAM 302.

In Step 1103, the image forming device 10 transmits the acquired paper fingerprint information to the server 40, and requests the server 40 to perform the checking processing. The server 40 performs the paper fingerprint information checking processing, and transmits a result of determination to the image forming device 10. Also, as a result of the checking, if the server 40 determines that the paper fingerprint information coincides with the other one, it sends image data registered for the paper fingerprint information to the image forming device 10.

In Step 1104, the image forming device 10 displays the received determination result on the operating screen of the operating unit 12.

Figure 12:
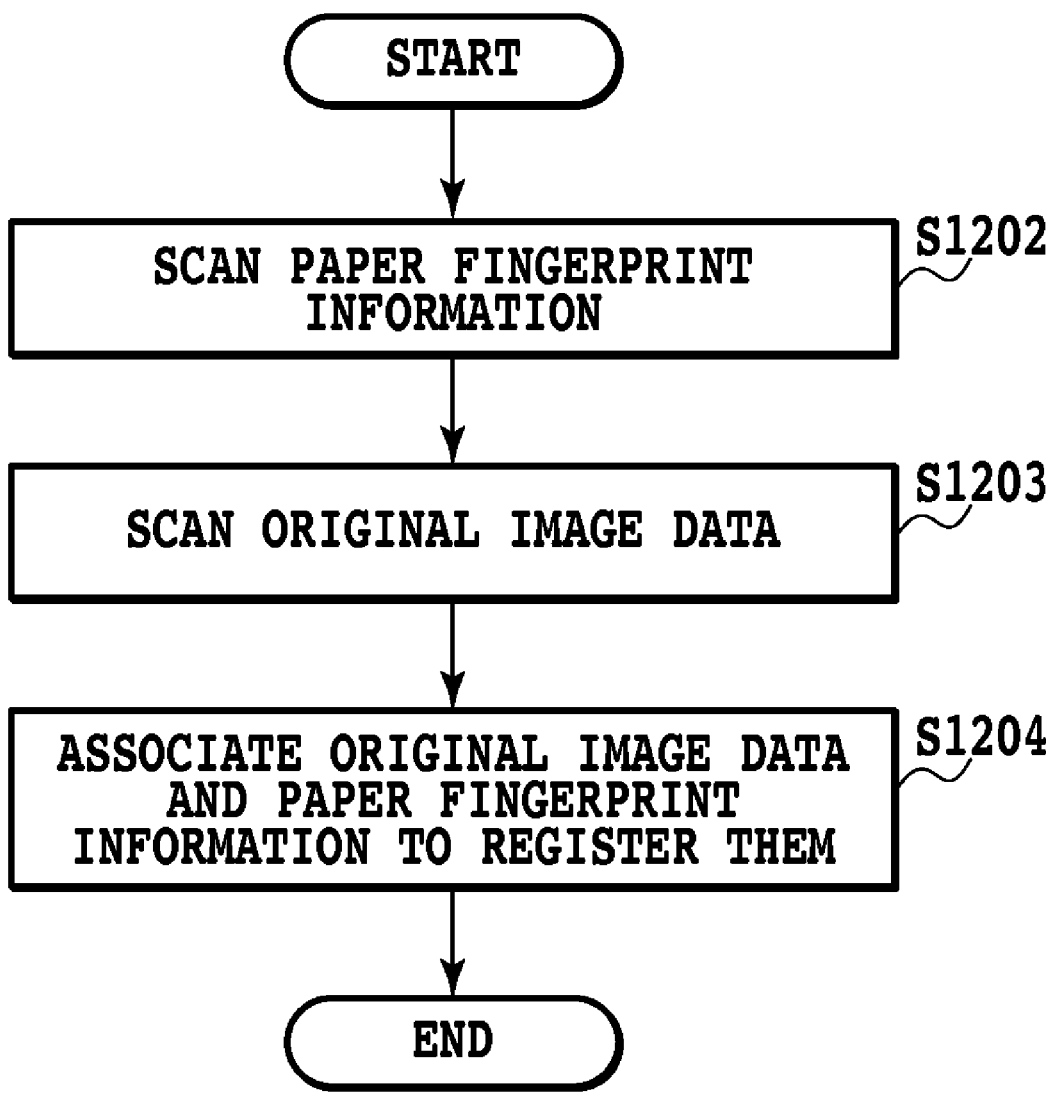
FIG. 12 is a diagram illustrating a basic processing flow for a case where "Paper fingerprint information registration" is selected in the operating unit.

Next, a basic processing flow for a case where "Paper fingerprint information registration" is selected in the operating unit 12 is described with reference to FIG. 12.

In S1202, a copier scans the paper fingerprint information of the original.

In S1203, the copier scans the original image data of the original.

In S1204, the copier associates the scanned paper fingerprint information and the original image data with each other to store them in the server.

Figure 13:
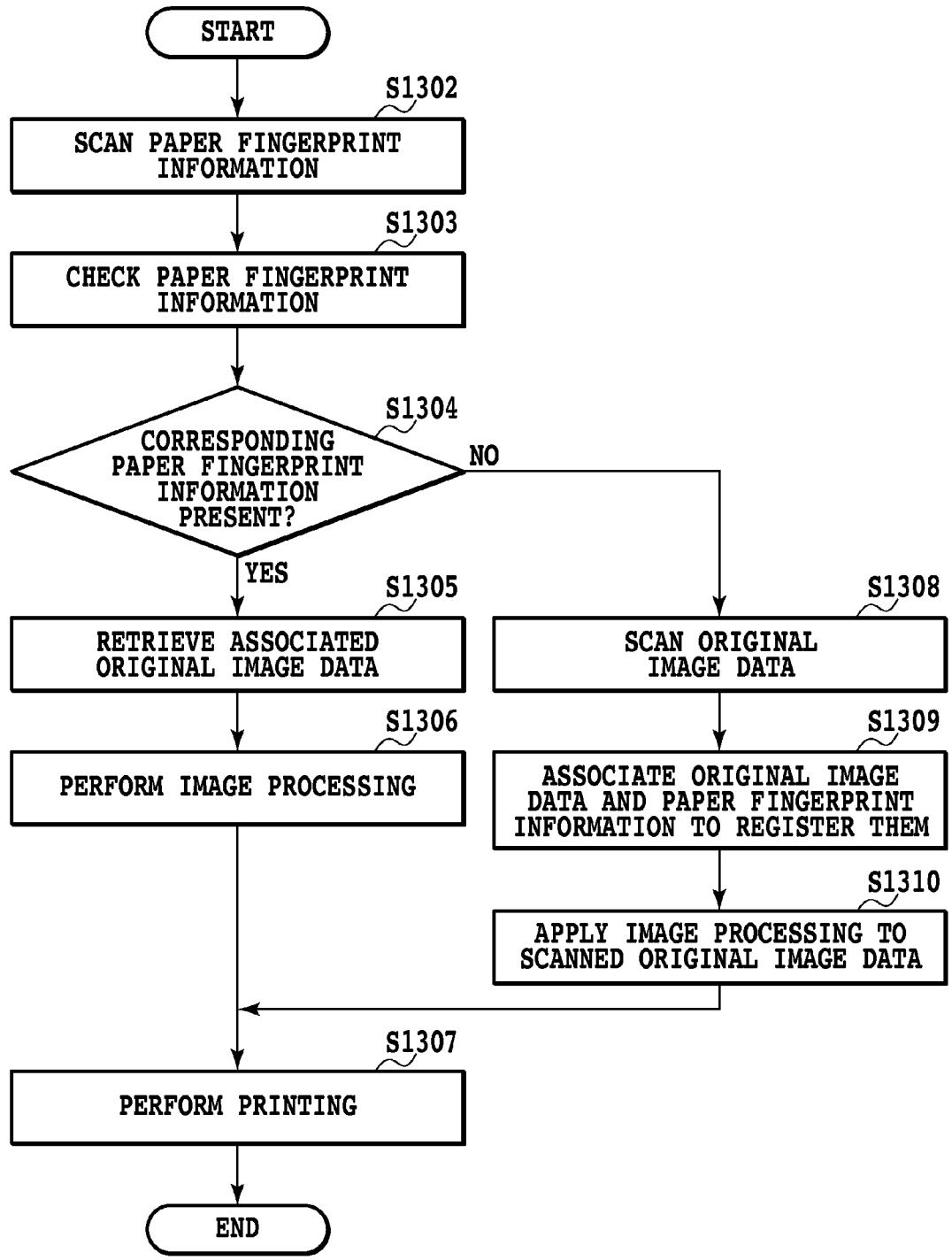
FIG. 13 is a diagram illustrating a basic processing flow for a case where "Paper fingerprint information check" is selected in the operating unit.

Next, a basic processing flow for a case where "Paper fingerprint information check" is selected in the operating unit is described with reference to FIG. 13.

In S1302, the copier scans the paper fingerprint information of the original.

In S1303, the copier sends the scanned paper fingerprint information to the server, and instructs the server to check the paper fingerprint information. That is, the copier sends to the server a request for checking whether or not the scanned paper fingerprint information has already been registered in the server.

In S1304, the server determines whether or not the paper fingerprint information sent from the copier has already been registered in the server. As a result of the determination, if the server determines that the paper fingerprint information has already been registered, the flow proceeds to processing in S1305, whereas if it determines that the paper fingerprint information has not been registered, the flow proceeds to processing in S1308.

In S1305, the server retrieves original image data associated with the registered paper fingerprint information, and sends it to the copier.

In S1306, the copier applies predetermined image processing to the received original image data.

In S1307, the copier prints out the image-processed original image data.

In S1308, original image data is scanned.

In S1309, the copier sends the scanned paper fingerprint information and original image to the server, and then the server associates them with each other to register them.

In S1310, the copier applies the predetermined image processing to the original image data scanned in S1308.

If a device for registering the paper fingerprint information and the image data is one, such as the HDD 304, incorporated in the image forming device, a device for checking is also one incorporated in the image forming device and the image data is read out from a device incorporated in the image forming device in accordance with a result of the checking.

Next, a first example of data handling using the present embodiment is described with reference to the drawings.

Figure 14:
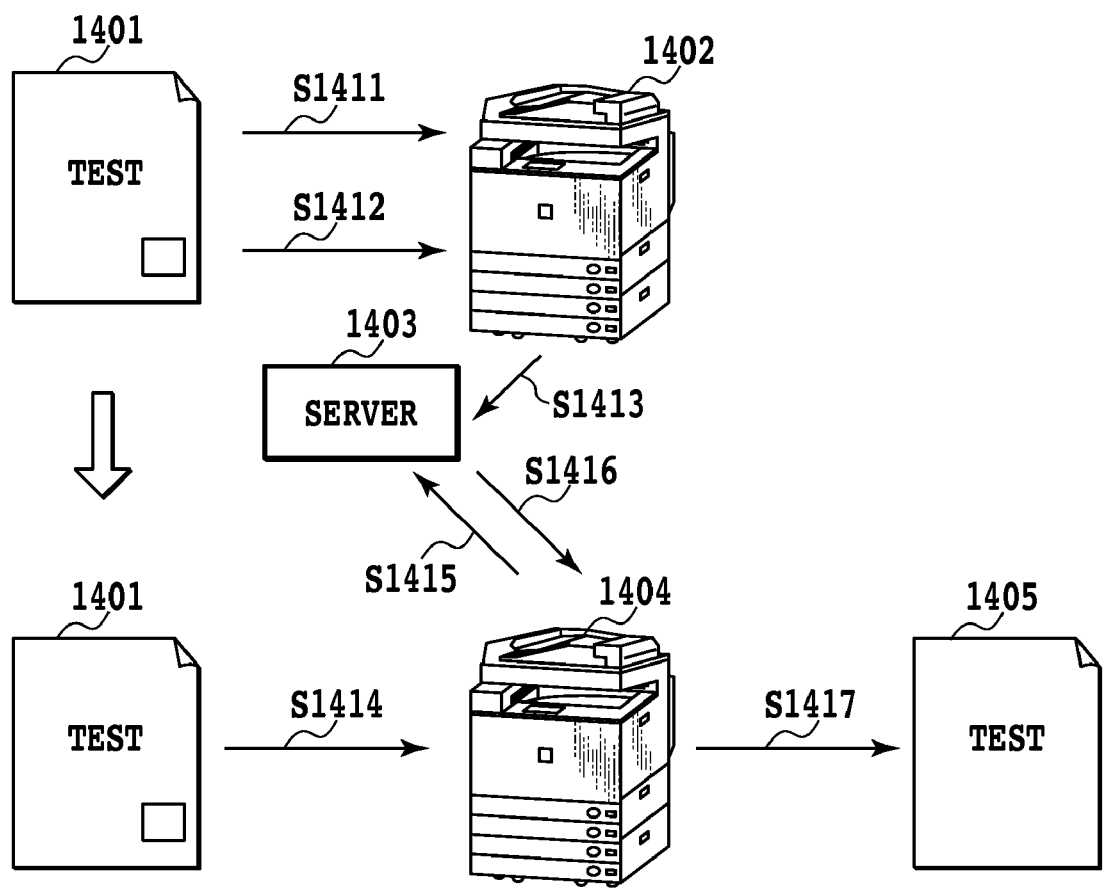
FIG. 14 is a diagram for explaining a first example of data handling using the present embodiment.

In FIG. 14, Reference numerals 1402 and 1404 represent MultiFunction Peripherals (MFPs); 1403 a server; 1401 an original to be copied; and 1405 an outputted original (copy output) obtained by copying "1401". Each of the MFPs 1402 and 1404 is one having functions of a printer, fax, copier, scanner, and the like by itself. Each of the MFPs 1402 and 1404 comprises the scanner function for scanning paper fingerprint information and original image data of the original upon registration of the paper fingerprint information or upon checking of the paper fingerprint information, and the printer function for printing out the scanned original image data.

The original 1401 is used when the paper fingerprint information is registered in the server 1403 or when the server 1403 is requested to check the paper fingerprint information. At a predetermined position of the original 1401, there is a paper fingerprint information scanning area, and the MFPs 1402 and 1404 scan the paper fingerprint information from the paper fingerprint information scanning area.

The server 1403 communicates with the MFPs 1402 and 1404 via a network such as a LAN (not shown).

Note that in the diagram, Reference numeral 1402 represents the MFP; however, it may be a scanner only. Also, in the diagram, the MFPs 1402 and 1404 are illustrated as the separate devices; however, they may be the same device.

Upon registration of the paper fingerprint information, a scanner of the MFP 1402 scans the paper fingerprint information of the original 1401 (S1411). To scan the paper fingerprint information, the amount of light of an original illuminating light source of the scanner should be smaller than that for scanning usual image data. Accordingly, the scanner of the MFP 1402 scans the original 1401 with the amount of light of the original illuminating light source being reduced.

Upon registration of the paper fingerprint information, the scanner of the MFP 1402 scans an original image of the original 1401 (S1412). The MFP 1402 scans the original image with the amount of light of the original illuminating light source being restored.

The MFP 1402 registers in the server 1403 the paper fingerprint information and original image data respectively scanned by the operations in S1411 and S1412 (S1413). The server 1403 associates the paper fingerprint information and original image data sent from the MFP 1402 with each other to register them. The reason why the paper fingerprint information and original image data are associated with each other for the registration is for retrieving original image data associated with paper fingerprint information newly sent from the MFP 1402 and sending it to the MFP 1404 at the time of the after-mentioned paper fingerprint information checking.

Upon checking/copying of the paper fingerprint information, a scanner of the MFP 1404 scans the paper fingerprint information of the original 1401 (S1414). To scan the paper fingerprint information, the amount of light of an original illuminating light source of the scanner should be smaller than that for scanning usual image data. Accordingly, the scanner of the MFP 1404 scans the original 1401 with the amount of light of the original illuminating light source being reduced.

The MFP 1404 sends to the server 1403 the paper fingerprint information scanned by the operation in S1414, and instructs the server 1403 to check the paper fingerprint information (S1415). The MFP 1404 sends the scanned paper fingerprint information to the server 1403. The server 1403 checks whether or not the paper fingerprint information sent from the MFP 1404 has already been registered in the server 1403.

As a result of the checking, if the server 1403 determines that paper fingerprint information coinciding with the paper fingerprint information sent from the MFP 1404 has already been registered, the server 1403 sends to the MFP 1404 original image data registered in association with the registered paper fingerprint information (S1416).

The MFP 1404 prints the original image data received from the server 1403 (S1417).

The above example describes the data handling for a case where as a result of the operation in S1415, the paper fingerprint information sent by the MFP 1404 coincides with that having been registered in the server 1403. On the other hand, if the both do not coincide with each other, the paper fingerprint information sent to the server 1403 by the operation in S1415 is one not having been registered in the server 1404. That is, the original scanned in S1414 is one scanned for the first time. In this case, after scanning the paper fingerprint information in S1414, the MFP 1404 automatically scans the original image data with another scan using the usual amount of light, and then in S1415, sends the original image data to the server 1403. The server 1403 associates the paper fingerprint information and original image data received from the MFP 1404 with each other to register them. The original image data associated with the received paper fingerprint information has not been registered, so that in S1416, the original image data is, of course, not transmitted.

The MFP 1404 performs printing with the use of the original image data scanned with the usual amount of light in S1414 (S1417).

It is supposed that the original 1401 comprises a plurality of pages. Upon registering paper fingerprint information, image data corresponding to all of the pages is registered in association with paper fingerprint information of a first page in the original 1401. Upon checking/copying paper fingerprint information, the paper fingerprint information of the first page is scanned with the amount of light being smaller than that for usual scanning. Then, the obtained paper fingerprint information is checked in a manner described above. As a result of the checking, if it is determined that the paper fingerprint information of the first page has already been registered, the MFP 1404 receives image data corresponding to all of pages to print out. Namely, if the original 1401 comprises a plurality of pages, the MFP 1404 can print out image data corresponding to all of the pages as long as only the paper fingerprint information of the first page is scanned.

According to this example, in either case of S1411 or S1414, when the original is scanned for the first time, the paper fingerprint information and original image data are associated with each other, and then registered in the server 1403, so that when the original is scanned again, it is only necessary to scan the paper fingerprint information. That is, when the original is copied for the second time or later, the MFP is not required to scan the original image data, so that efficiency of copying work is improved.

Note that this example is configured such that the server 1403 performs the paper fingerprint information checking processing, upon receipt of the check request from the MFP 1404; however, it may be configured such that the MFP 1402 performs the paper fingerprint information checking processing instead of the server 1403, upon receipt of the check request from the MFP 1404. Also, in this example, the MFPs 1402 and 1404 are illustrated as the separate devices; however, they may be the same device. In such a case, the MFP performs the paper fingerprint information registration processing and paper fingerprint information checking processing by itself.

Next, a second example of the data handling using the present embodiment is described with reference to the drawings.

Figure 15:
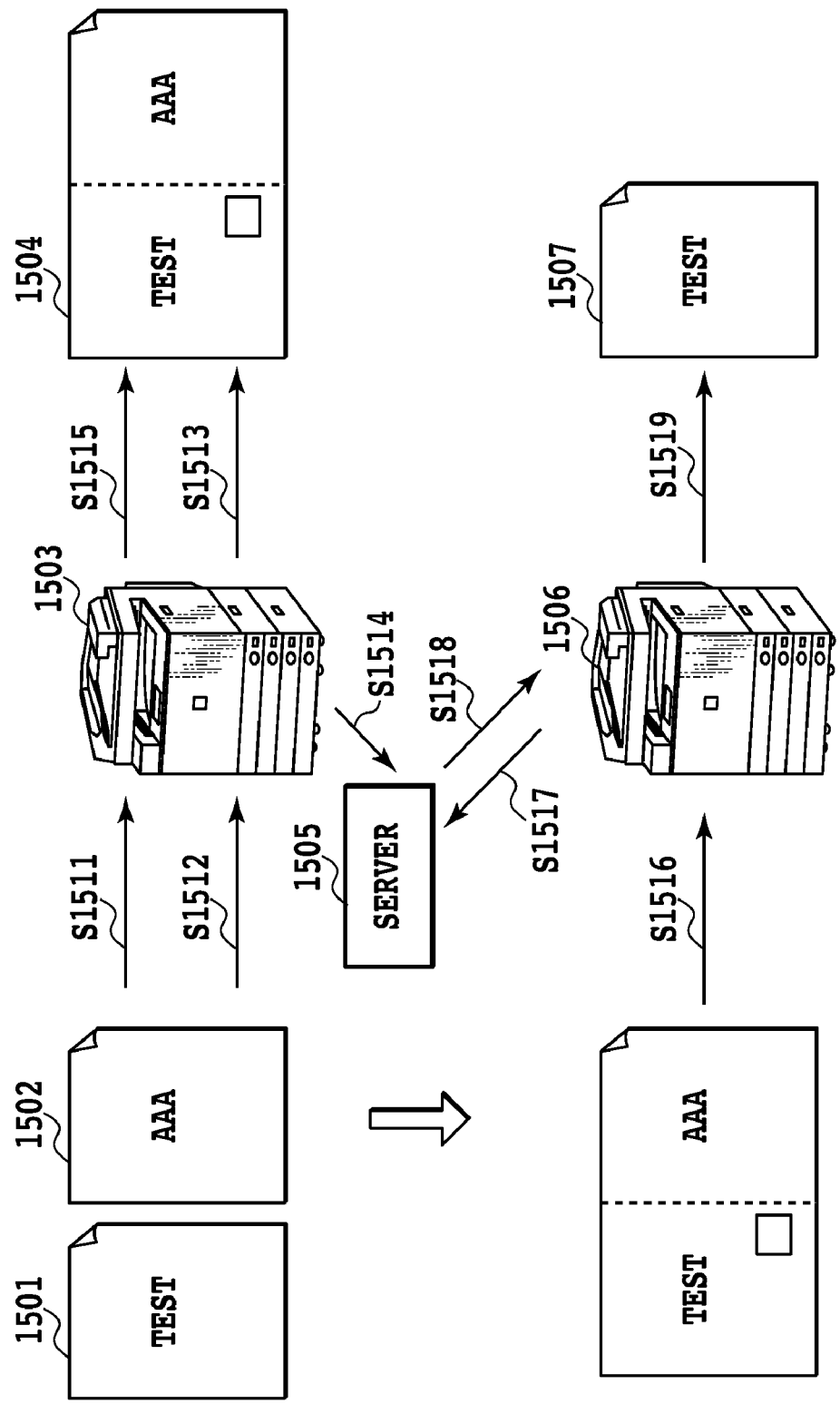
FIG. 15 is a diagram for explaining a second example of the data handling using the present embodiment.

In FIG. 15, Reference numerals 1503 and 1506 represent MFPs; 1505 a server; 1501 and 1502 originals to be copied; and 1504 and 1507 sheets of output paper (copy outputs). Each of the MFPs 1503 and 1506 is one having functions of a printer, fax, copier, scanner, and the like by itself. Each of the MFP 1503 and 1506 comprises the scanner function for scanning paper fingerprint information and original image data of the original upon registration of the paper fingerprint information or upon checking of the paper fingerprint information, and the printer function for printing out the scanned original image data.

In this example, a description is given for a case of processing for outputting originals having N pages (a plurality of pages) integrally in one sheet of output paper (referred to as "N-Up processing"). For descriptive convenience, the processing for outputting originals having 2 pages in one sheet of output paper side by side (referred to as "2-Up processing") is taken as an example to give the description.

Reference numeral 1501 represents a first original, and 1502 a second original. Suppose that the first and second originals 1501 and 1502 are set in a scanner of the MFP 1503, and then copying is performed with a setting for the 2-Up processing being made.

The server 1503 communicates with the MFPs 1503 and 1506 via a network such as a LAN (not shown).

A scanner of the MFP 1503 scans original image data of the original 1501 (S1511).

The scanner of the MFP 1503 scans original image data of the original 1502 (S1512).

The MFP 1503 applies the 2-Up processing to the two pieces of original image data scanned by the MFP 1503, and prints them. Reference numeral 1504 is the output paper printed after the application of the 2-Up processing. As illustrated in the diagram, on the output paper 1504, the first original image data of the first original 1501 and the second original image data of the second original 1502 are printed side by side. The output paper 1504 is, of course, a sheet of paper different from "1501" and "1502".

The MFP 1503 scans paper fingerprint information of the output paper 1504 upon printing (S1513)

To scan the paper fingerprint information of the output paper 1504, means different from that for scanning pieces of paper fingerprint information of the originals 1501 and 1502 is required. This is because a path through which the originals 1501 and 1502 are fed is completely different from that through which the output paper is fed, so that the both (output paper and originals) cannot be scanned by the same paper finger print information scanning means. In this example, the originals 1501 and 1502 are fed in the order of the scanner, the means for scanning the pieces of paper fingerprint information from the originals, and original discharging means, whereas the output paper is fed in the order of an output paper stacking unit, the means for scanning the paper fingerprint information from the output paper, image forming means, and output paper discharging means. That is, in this example, it is supposed that the means for scanning the paper fingerprint information from the output paper is arranged between the output paper stacking unit and the image forming means, and the paper fingerprint information is scanned during the feeding of the output paper through the above path.

In addition, the means for scanning the paper fingerprint information from the original and that for scanning the paper fingerprint information from the output paper have the same scanning accuracy. Accordingly, if these means scan paper fingerprint information from the same area of the same paper, the two pieces of scanned paper fingerprint information are the same. As a result, if the paper fingerprint information scanned from the output paper and that scanned from the original coincide with each other, it means that the two pieces of paper fingerprint information were scanned from the same paper.

Upon receipt of the original image data scanned by the operation in S1511, the original image data scanned in S1512, and the paper fingerprint information scanned in S1513, the server 1505 associates them with one another to register them (S1514). At this time, the server 1505 also simultaneously associates with them page information indicating that "1501" is the first page original and "1502" is the second page original, to register it.

The MFP 1503 applies the 2-Up processing to the two pieces of original image data scanned by the operations in S1511 and S1512, and prints them on the output paper 1504 (S515).

Upon scanning processing for the paper fingerprint information checking processing, a scanner of the MFP 1506 scans the output paper 1504 with the amount of light being smaller than that for usual scanning to read out the paper fingerprint information of the output paper 1504 (S1516).

The MFP 1506 sends to the server 1505 the paper fingerprint information scanned by the operation in S1516, and instructs the server 1505 to check the paper fingerprint information (S1517).

The MFP 1506 sends the scanned paper fingerprint information to the server 1505.

The server 1505 checks whether or not the scanned paper fingerprint information has already been registered in the server 1505.

As a result of the checking, if it is determined that paper fingerprint information coinciding with the paper fingerprint information sent from the MFP 1506 has already been registered, the server 1505 sends to the MFP 1506 the first and second pieces of original image data registered in association with the registered paper fingerprint information (S1518). The server 1505 also sends to the MFP 1506 the page information indicating that the first original image data corresponds to the first page, and the second original image data corresponds to the second page, at the same time.

The MFP 1506 selects which page of the two pieces of original image data received from the server 1505 should be printed, and prints the selected page on the output paper 1507 (S1519). The MFP 1506 displays on an operating unit a selection screen for selecting whether the first page, or second page, or both of them should be printed, or the like, to prompt the user to select any of them. In this example, the first page (first original image data) is selected.

According to this example, the paper fingerprint information of the output paper 1504 outputted after the 2-Up processing, and the two pieces of original image data of the originals 1501 and 1502 used for the 2-Up processing are associated with each other, and then registered in the server 1505. Subsequently, upon copying of the output paper 1504, the MFP 1506 reads and prints out the first original image data and/or the second original image data associated with the paper fingerprint information registered in the server 1505.

Also, in this example, the MFPs 1503 and 1506 are illustrated as the separate devices; however, they may be the same device. In such a case, the MFP performs the paper fingerprint information registration processing and paper fingerprint information checking processing by itself.

Next, a third example of the data handling using the present embodiment is described with reference to the drawings.

Figure 16:
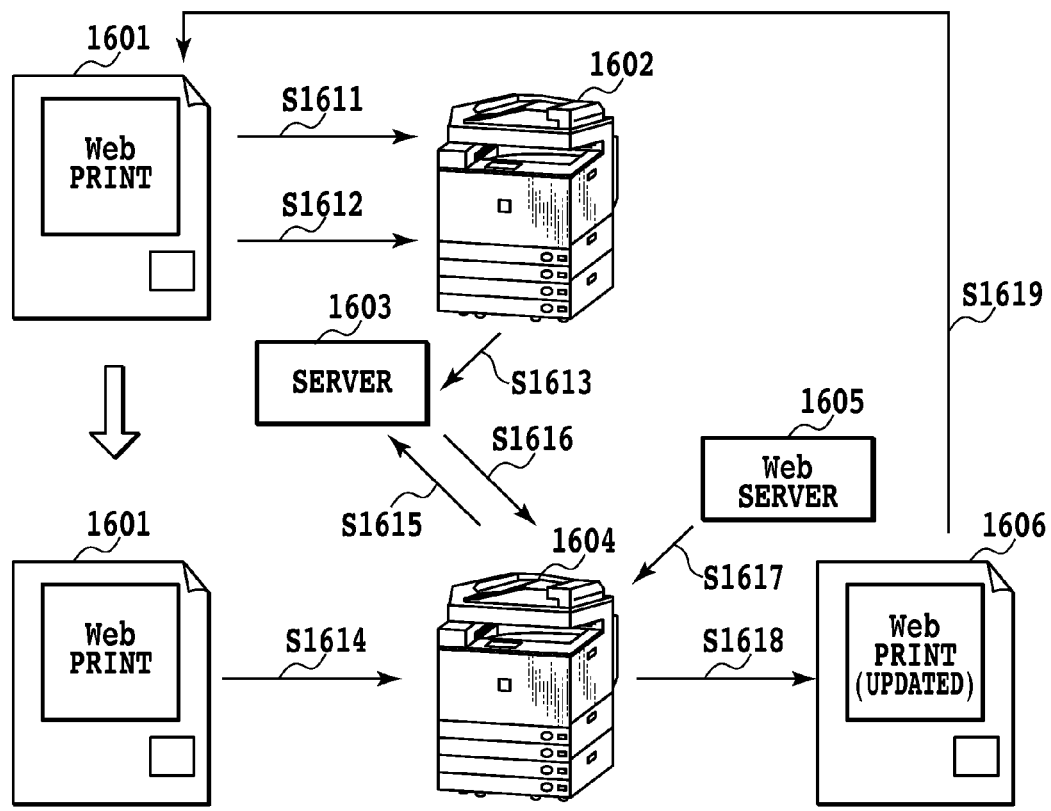
FIG. 16 is a diagram for explaining a third example of the data handling using the present embodiment.

In FIG. 16, Reference numerals 1602 and 1604 represent MFPs, and 1603 a server same as the above-described server. Reference numeral 1605 represents a Web server, which outputs a Web page on which a URL is entered. The servers 1603 and 1605 communicate with the MFPs 1602 and 1604 via a network such as a LAN (not shown). Reference numeral 1601 is an original printed out by a MFP (not shown) other than those 1602 and 1604. It is supposed that the original 1601 is printed with a Web page, as well as being printed with a URL for the Web page or embedded therein with the URL by means of a digital watermark or the like. Reference numeral 1606 is a printout. In this example, the original printed with the Web page is scanned, and then the original 1606 printed with an updated version of the Web page is printed out. Each of the MFPs 1602 and 1604 is one having functions of a printer, fax, copier, scanner, and the like by itself. Each of the MFPs 1602 and 1604 comprises the scanner function for scanning paper fingerprint information and original image data of an original upon registration of the paper fingerprint information or upon checking of the paper fingerprint information, and the printer function for printing out the scanned original image data. In the diagram, the MFPs 1602 and 1604 are illustrated as the separate devices; however, they may be the same device.

Upon registration of paper fingerprint information, a scanner of the MFP 1602 scans paper fingerprint information of the original 1601 (S1611). To scan the paper fingerprint information, the amount of light of an original illuminating light source of the scanner should be smaller than that for scanning usual image data. Accordingly, the scanner of the MFP 1602 scans the original 1601 with the amount of light of the original illuminating light source being reduced.

Upon registration of paper fingerprint information, the scanner of the MFP 1602 scans an original image of the original 1601 (S1612). The MFP 1602 scans the original image with the amount of light of the original illuminating light source being restored. When scanning the original image, the MFP 1602 also scans the URL printed on the original or embedded in the original together.

The MFP 1602 registers in the server 1603 the paper fingerprint information scanned by the operation in S1611, and the original image data and URL scanned by the operation in S1612 (S1613). This operation causes the server 1603 to associate the paper fingerprint information and URL sent from the MFP 1602 with each other, and register them. The reason why the paper fingerprint information and URL are associated with each other for the registration is for retrieving a URL corresponding to paper fingerprint information newly sent from the MFP 1602 and sending it to the MFP 1604 at the time of the after-mentioned paper fingerprint information checking.

At the time of the paper fingerprint information checking processing, a scanner of the MFP 1604 scans the paper fingerprint information of the original 1601 (S1614). To scan the paper fingerprint information, the amount of light of an original illuminating light source of the scanner should be smaller than that for scanning usual image data. Accordingly, the scanner of the MFP 1604 scans the original 1601 with the amount of light of the original illuminating light source being reduced.

The MFP 1604 sends the paper fingerprint information scanned by the operation in S1614 to the server 1603, and instructs the server 1603 to check the paper fingerprint information (S1615). The MFP 1604 sends the scanned paper fingerprint information to the server 1603. The server 1603 checks whether or not the paper fingerprint information sent from the MFP 1604 has already been registered in the server 1603.

As a result of the checking, if the server 1603 determines that paper fingerprint information coinciding with the paper fingerprint information sent from the MFP 1604 has already been registered, the server 1603 sends URL registered in association with the registered paper fingerprint information to the MFP 1406 (S1616).

The MFP 1604 downloads a Web page corresponding to the received URL from the Web server 1605 (S1617).

The MFP 1604 determines whether or not the downloaded Web page has been updated since the original 1601 was printed out, and if the MFP 1604 determines that the Web page has been updated, it prints out the updated Web page on the original 1606 (S1618).

Paper fingerprint information and URL of the original 1606 are registered in the server 1603 in a manner same as that in S1611 to S1613 (S1619). Based on this, the number of pieces of paper fingerprint information associated with the URL becomes two, i.e., the paper fingerprint information of the original 1601 and that of the original 1606, so that even if any of the original 1601 or 1606 is copied after this, the latest Web page is printed out.

According to this example, by associating the URL corresponding to the Web page printed on the original and the paper fingerprint information of the original with each other to register them in the server 1603, the latest Web page can be printed.

This example is configured such that the MFP 1604 downloads the Web page from the Web server 1605 on the basis of the URL sent from the server 1603, without exception. The other example includes a configuration in which if a URL and Web page update date/time information are embedded in the original 1601 with a digital watermark, the paper fingerprint information, URL, and Web update date/time information are registered in the server 1603. For example, if paper fingerprint information coincides with the other one as a result of checking of it, update date/time information registered in the server 1603 in association with the paper fingerprint information and latest update date/time information on a Web page in the Web server 1605 are compared with each other. As a result of the comparison, only if latest update date/time information on the Web page in the Web server 1605 is newer than the update date/time information registered in the server 1603, the MFP 1604 downloads the Web page from the Web server 1605.

Next, a fourth example of the data handling using the present embodiment is described with reference to the drawings.

Figure 17:
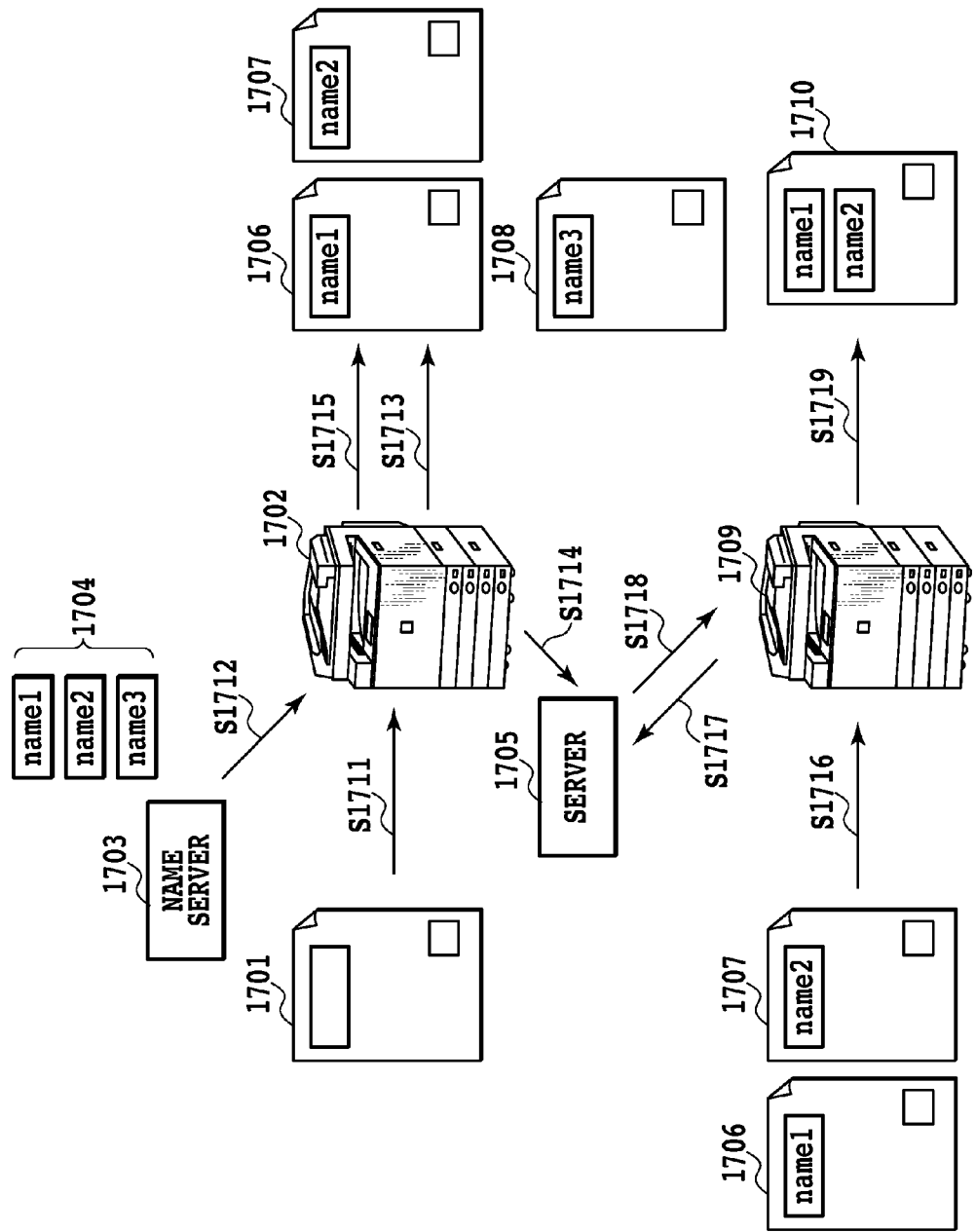
FIG. 17 is a diagram for explaining a fourth example of the data handling using the present embodiment.

In FIG. 17, Reference numerals 1702 and 1709 represent MFPs, and 1703 and 1705 servers. The servers 1703 and 1705 communicate with the MFPs 1702 and 1709 via a network such as a LAN (not shown). In the diagram, the MFPs 1709 and 1702 are illustrated as the separate MFPs; however, both of them may be one and the same MFP.

Reference numeral 1701 represents an original in a predetermined format such as a questionnaire form.

Reference numerals 1706 and 1707 represent a plurality of sheets of output paper on which pieces of name information of questionnaire target persons are variably printed in respective name entry spaces of the questionnaire forms. Note that the name information is in a variable data format. The variable data is data used when printing is variably performed with the use of various pieces of information on a sheet-by-sheet basis, upon variable printing. For usual printing, the same content is printed on a large number of sheets of paper; however, for the variable printing, various pieces of content are printed on a sheet-by-sheet basis. The variable data having the largest size in Japan is data corresponding to variable information that is different on a sheet-by-sheet basis, such as an amount charged for the use of public utilities, mobile phone, credit card, or the like, a direction of a direct mail or the like, a business form, a book, or a workbook used in a cram school. Reference numeral 1710 represents output paper.

The original 1701 is printed with predetermined content besides the name entry space. The MFP 1702 prints out pieces of original image data and variable data as a template and names respectively for the number of questionnaire target persons. In this example, it is supposed that the number of questionnaire target persons is three, each of which is selected in the variable data, and three sheets of paper are printed in total (1706 to 1708).

Reference numeral 1703 represents a name server. In the name server 1703, names of the questionnaire target persons (e.g., names of staff members within a section) are preregistered. The user selects which of the names registered in the name server 1703 to use, or the like, via an operating unit of the MFP 1702.

Reference numeral 1704 represents variable data selected by the user. In this example, names, i.e., name1, name2, and name3, for the three persons are supposed to be used.

The server 1705 associates paper fingerprint information and the variable data with each other to register them.

The output paper 1706 is the questionnaire form for a person whose name is name1; the output paper 1707 the questionnaire form for a person whose name is name2; and the output paper 1708 the questionnaire form for a person whose name is name3.

The output paper 1710 is printed with a list formed by making up pieces of variable data on the collected questionnaire forms.

A scanner of the MFP 1702 scans original image data of the original 1701 (S1711).

The MFP 1702 selects which of the names to use, on the basis of user entry from the operating unit, and receives the selected name in the variable data (name data) from the name server 1703 (S1712).

The MFP 1702 scans pieces of paper fingerprint information of the sheets of output paper 1706 to 1708 to be subjected to copy output (S1713). Because the number of sheets of papers to be printed out is known in S1712, the MFP 1702 scans the pieces of paper fingerprint information of the sheets of output paper for the number of sheets.

To scan the pieces of paper fingerprint information of the sheets of output paper 1706 to 1708, means different from that for scanning paper fingerprint information of the original 1701 is required. The reason for the requirement is as described above.

The MFP 1702 associates the variable data corresponding to the name data obtained in S1712 and the pieces of paper fingerprint information of the sheets of output paper 1706 to 1708 scanned in S1713 with each other to register them in the server 1705 (S1714).

In this example, the pieces of paper fingerprint information of the sheets of output paper 1706, 1707 and 1708, and the name1, name2, and name3 in the variable data 1704 are respectively associated with each other.

The MFP 1702 performs synthesis processing of the original image data scanned in S1711 and the variable data, name1, and prints out the questionnaire form 1706 (S1715). The questionnaire forms 1707 and 1708 are also printed out in the same manner. This results in the three questionnaire forms.

Subsequently, an operator of the questionnaire distributes the three outputted questionnaire forms 1706 to 1708 to the questionnaire target persons, and the two questionnaire forms 1706 and 1707 of them are supposed to be collected.

Upon checking of paper fingerprint information, a scanner of the MFP 1709 scans the pieces of paper fingerprint information of the questionnaire forms 1706 and 1707 (S1716).

The MFP 1709 sends the scanned pieces of paper fingerprint information to the server 1705, and instructs the server 1705 to check the pieces of paper fingerprint information (S1717).

It is supposed that as a result of the checking, the server 1705 determines that pieces of paper fingerprint information coinciding with the pieces of paper fingerprint information sent from the MFP 1709 have already been registered. In such a case, the server 1705 sends to the MFP 1709 part of the variable data for name1 and name2 registered in association with the registered pieces of paper fingerprint information (S1718).

The MFP 1709 lists the part of the name data obtained in S1718, and then prints out the list (S1719). The MFP 1709 obtains the part of the name data for name1 and name2 for the two persons, so that in this example, the part of the name data for the two persons is listed, and printed out on the output form 1710. According to this example, upon generation of sheets of printed paper each including a part of the variable data, paper fingerprint information on each of the sheets of printed paper and the part of the variable data are associated with each other, and then registered in the server. Based on this, when the above variably printed paper is scanned with a scanner as an original, a corresponding part of the variable data can only be extracted and outputted.

The above described the examples of the data handling using the present embodiment.

Finally, the algorithm for the paper fingerprint information checking processing is described.

<Displacement Correction for Paper Fingerprint Information>

$[(2n-1) \times (2m-1)]$ pieces of error values $E(i, j)$ caused when positions of two pieces of paper fingerprint information are displaced by $(i, j)$ are first obtained with the use of Expression 1.

$$E(i, j) = \frac{\sum_{x,y} \alpha_1(x, y)\alpha_2(x-i, y-j)\{f_1(x, y) - f_2(x, y)\}^2}{\sum \alpha_1(x, y)\alpha_1(x-i, y-j)}$$

In Expression 1, $\alpha_1$ represents mask data in "other paper fingerprint information". $f_1$ represents gray scale image data in the "other paper fingerprint information". $\alpha_2$ represents mask data in "paper fingerprint information". $f_2$ represents gray scale image data in the "paper fingerprint information".

Figure 18:
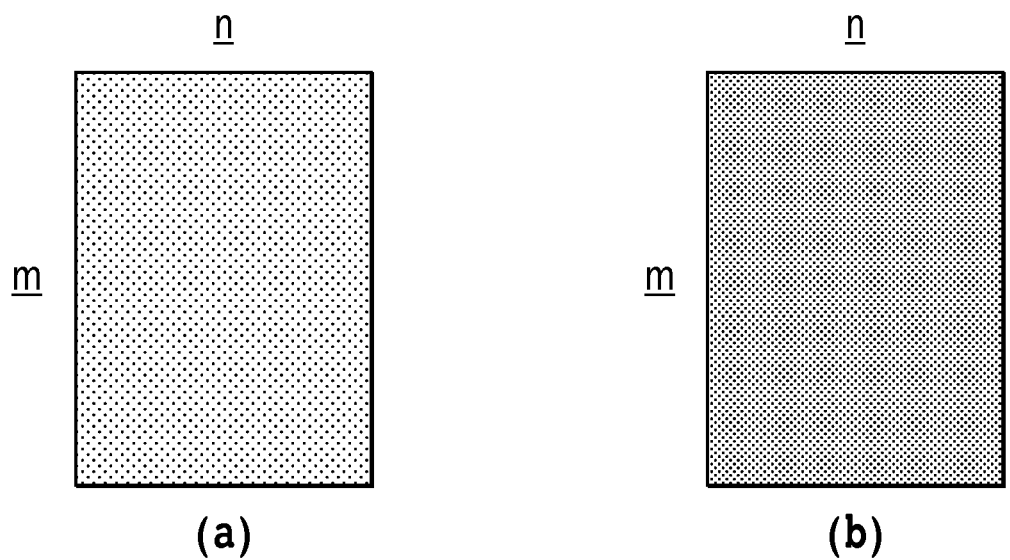
FIG. 18 is a diagram illustrating the paper fingerprint information.

FIG. 18 is a diagram illustrating pieces of paper fingerprint information. FIG. 18(a) illustrates the "other paper fingerprint information", and FIG. 18(b) the "paper fingerprint information". The paper fingerprint information substantially consists of n pixels horizontally and m pixels vertically.

In Expression 1, i and j are shifted within (−n+1~n−1) and (−m+1~m−1), respectively, on a pixel-by-pixel basis, to obtain the [(2n−1)×(2m−1)] error values E(i, j) between the "other paper fingerprint information" and the "fingerprint information". That is, E(−n+1, −m+1)~E(n−1, m−1) are obtained.

Figure 19:
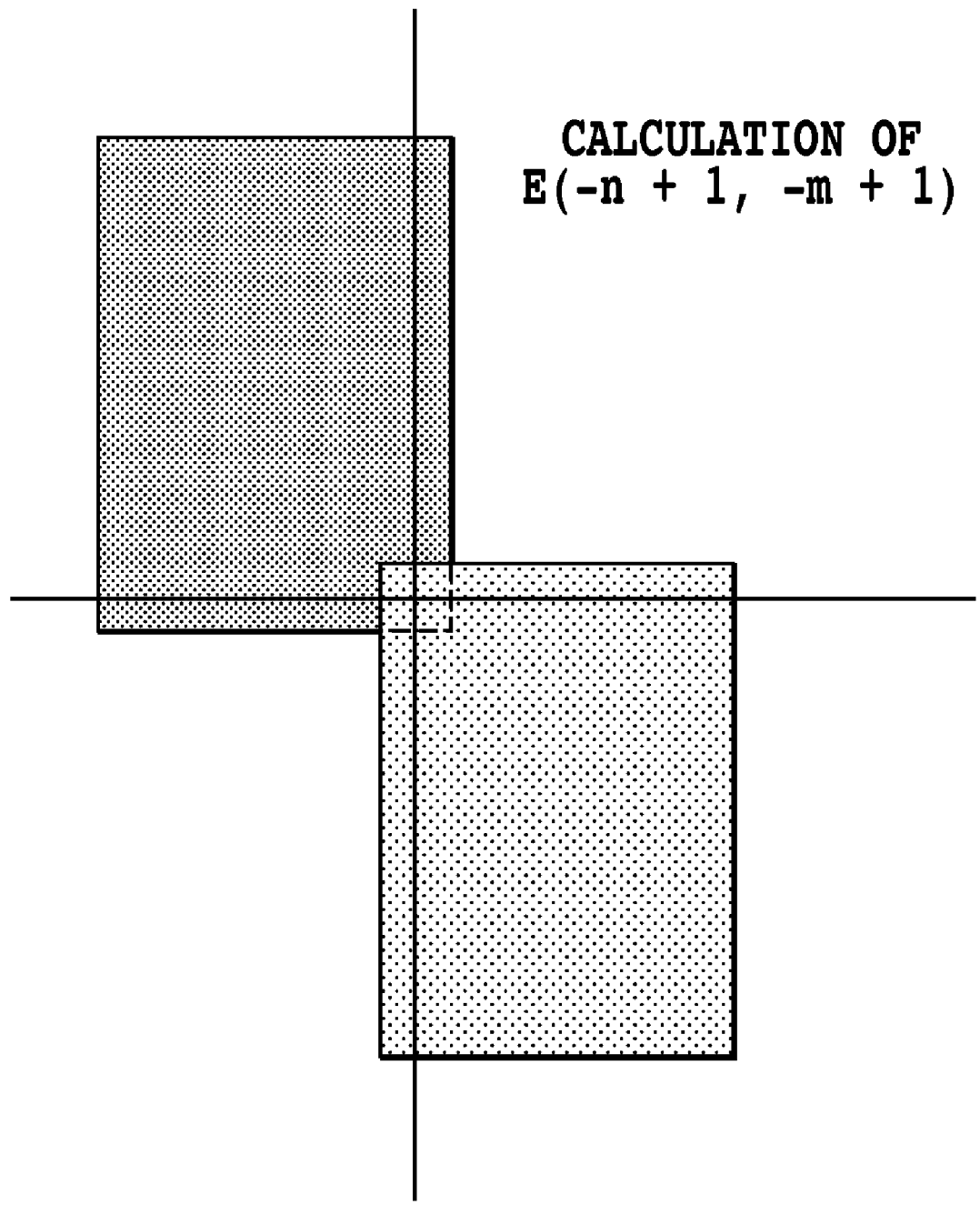
FIG. 19 is a diagram for explaining the paper fingerprint information checking processing.

FIG. 19 is a diagram illustrating a situation where one upper-left pixel of the "other paper fingerprint information" and one lower-right pixel of the "paper fingerprint information" overlap with each other. A value obtained by Expression 1 under this situation is supposed to be E (−n+1, −m+1).

Figure 20:
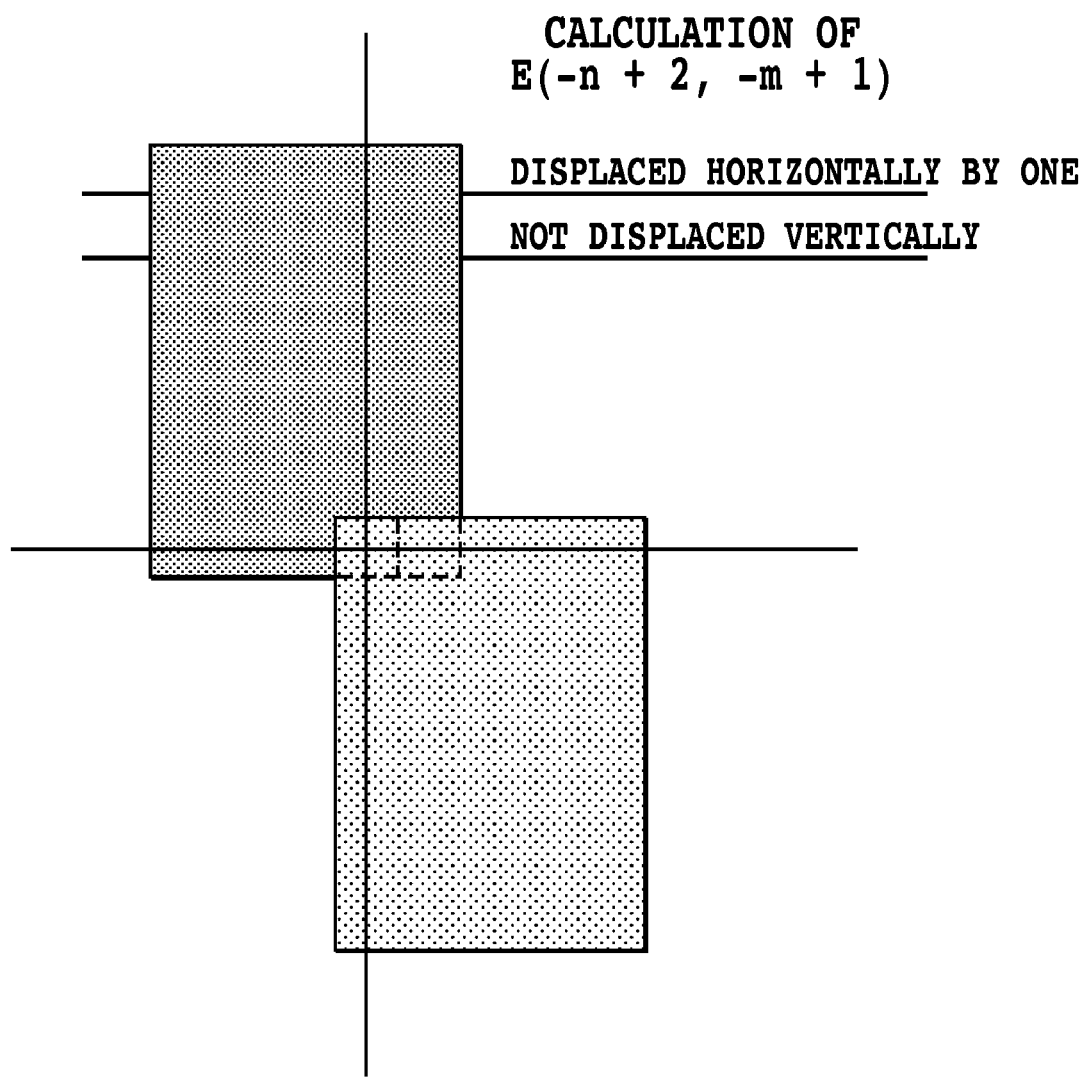
FIG. 20 is a diagram for explaining the paper fingerprint information checking processing.

FIG. 20 is a diagram illustrating a situation where the "paper fingerprint information" is displaced right by one pixel as compared with the situation in FIG. 19. A value obtained by Expression 1 under this situation is suppose to be E(−n+2, −m+1).

Figure 21:
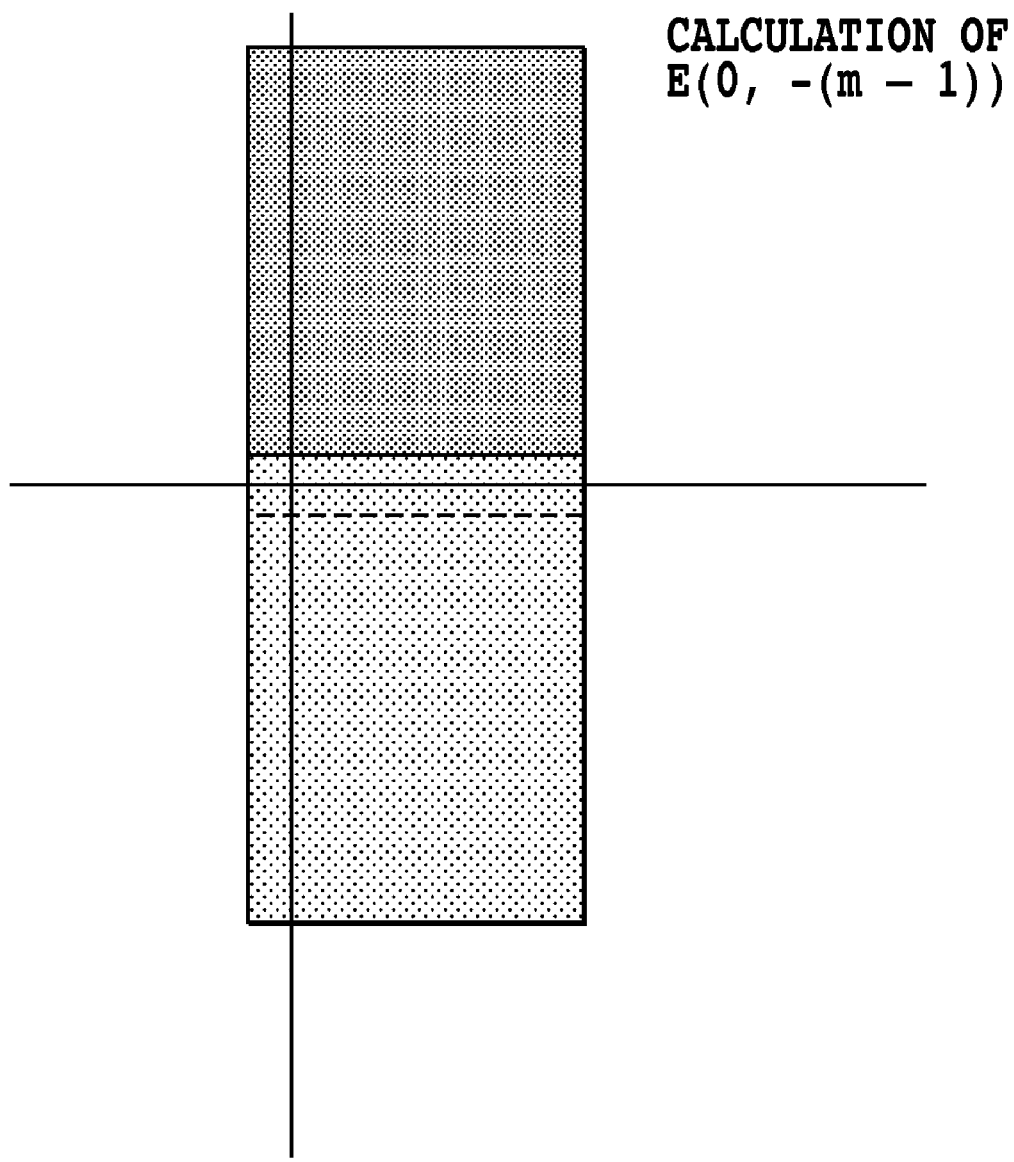
FIG. 21 is a diagram for explaining the paper fingerprint information checking processing.

FIG. 21 is a diagram illustrating a situation where the "paper fingerprint information" is displaced right, and consequently a pixel group in one bottom row of the "paper fingerprint information" and that in one top row of the "other paper fingerprint information" overlap with each other. A value obtained by Expression 1 under this situation is suppose to be E(0, −(m−1)).

Figure 22:
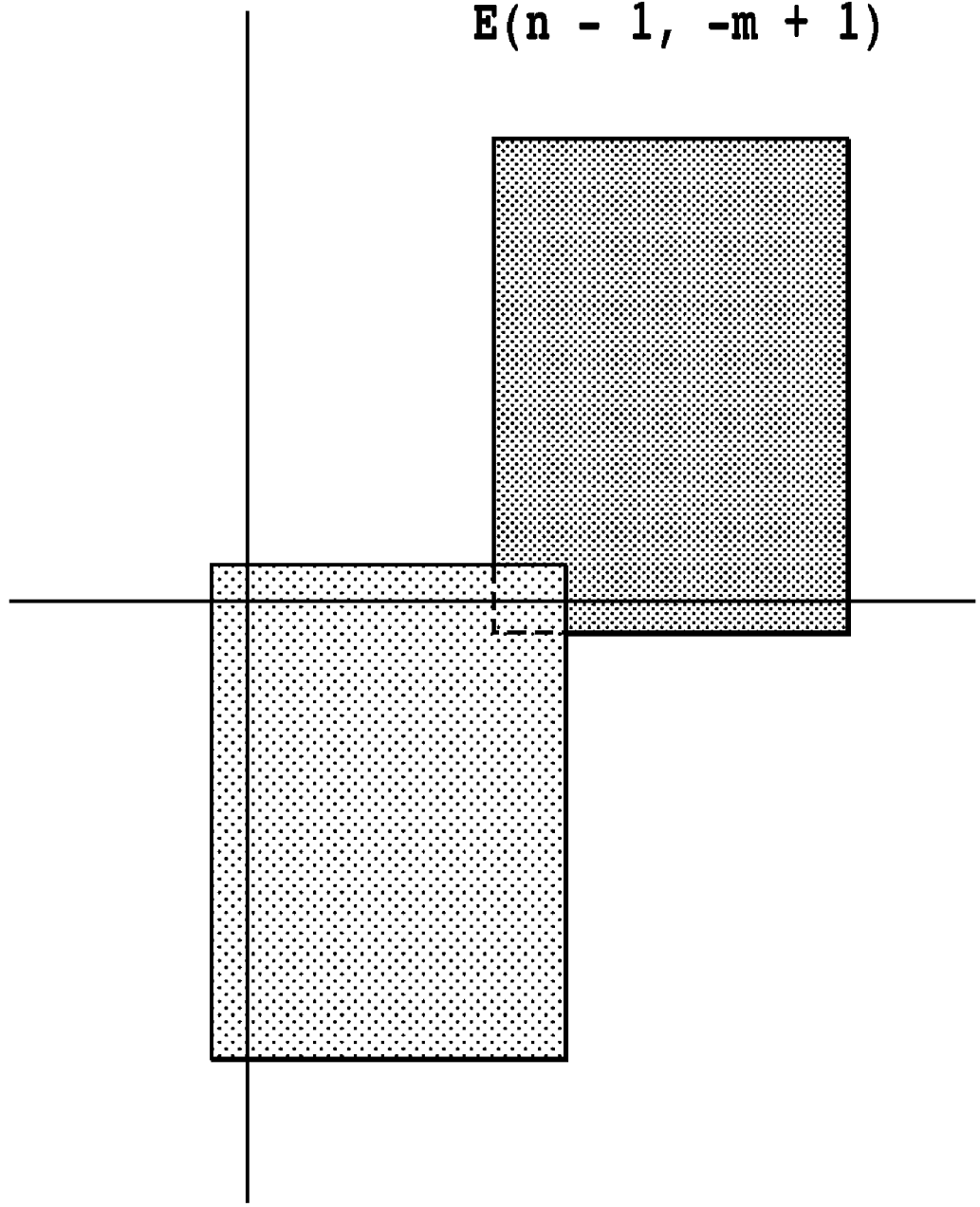
FIG. 22 is a diagram for explaining the paper fingerprint information checking processing.

FIG. 22 is a diagram illustrating a situation where the "paper fingerprint information" is displaced to the right end, and consequently a lower-left pixel of the "paper fingerprint information" and an upper-right pixel of the "other paper fingerprint information" overlap with each other. A value obtained by Expression 1 under this situation is suppose to be E(n−1, −m+1). As described, it turns out that if the "paper fingerprint information" is displaced in the right direction, "i" in E(i, j) is incremented by 1.

Figure 23:
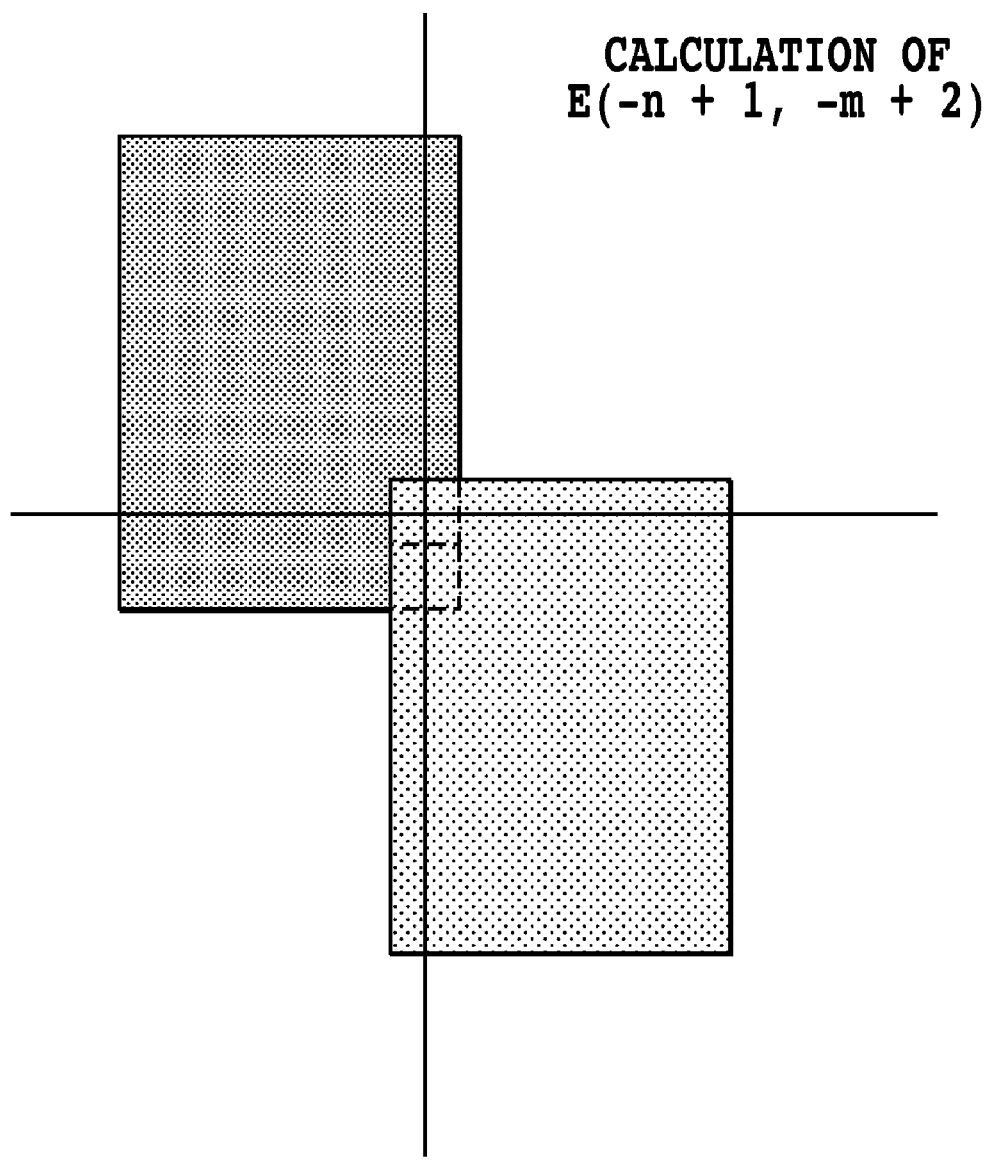
FIG. 23 is a diagram for explaining the paper fingerprint information checking processing.

FIG. 23 is a diagram illustrating a situation where the "paper fingerprint information" is displaced down by one pixel, as compared with the situation in FIG. 19. A value obtained by Expression 1 under this situation is suppose to be E(−n+1, −m+2).

Figure 24:
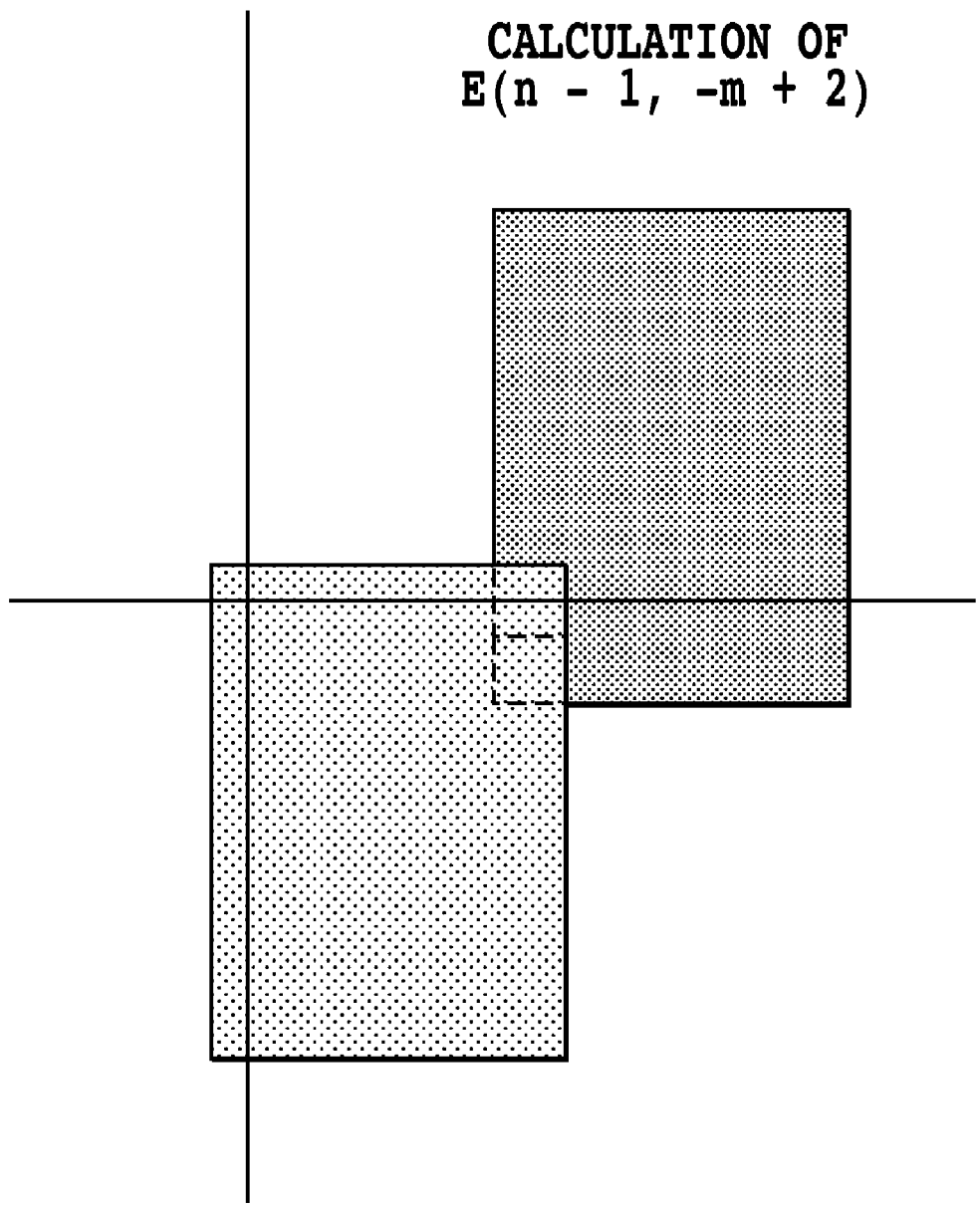
FIG. 24 is a diagram for explaining the paper fingerprint information checking processing.

FIG. 24 is a diagram illustrating a situation where the "paper fingerprint information" is displaced to the right end. A value obtained by Expression 1 under this situation is suppose to be E(n−1, −m+2).

Figure 25:
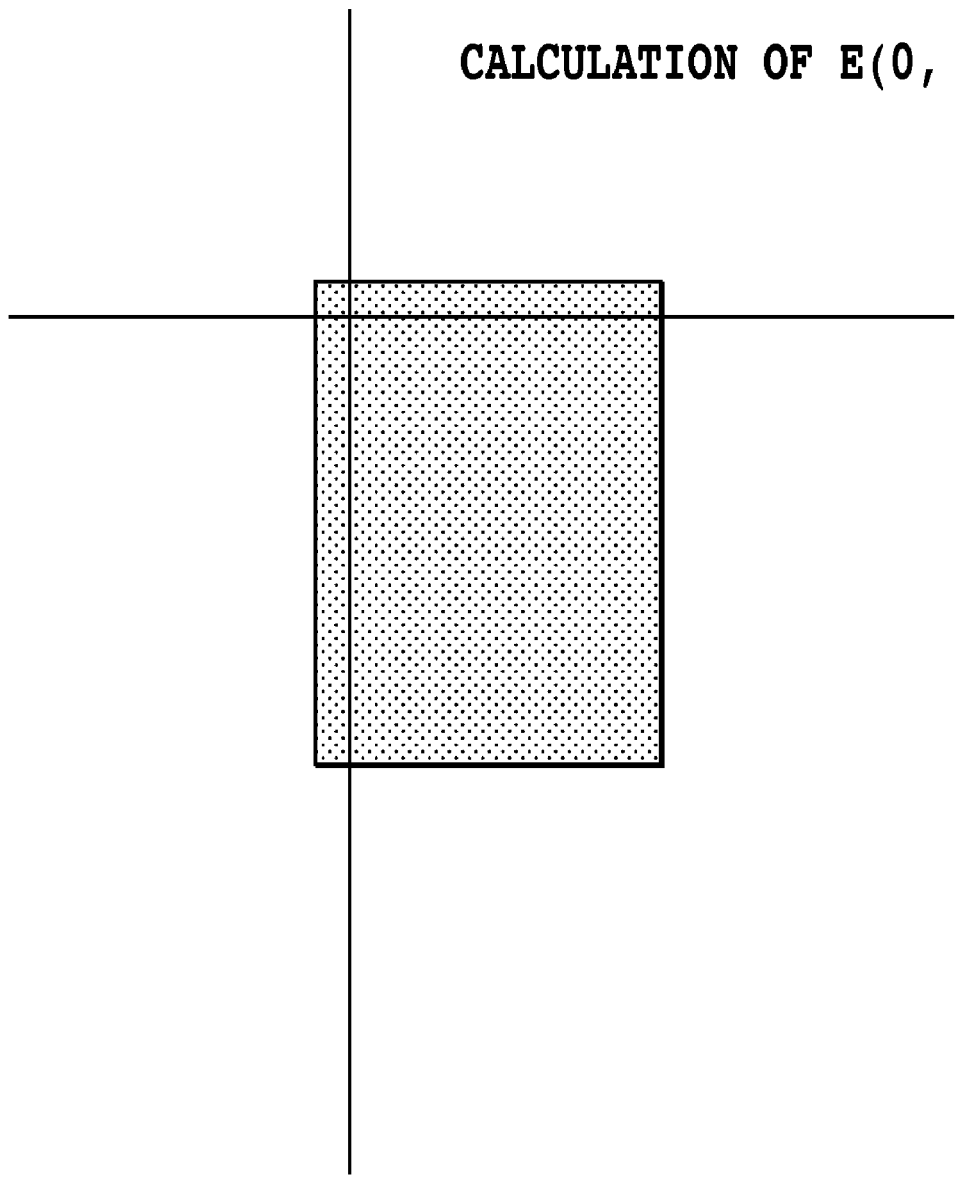
FIG. 25 is a diagram for explaining the paper fingerprint information checking processing.

FIG. 25 is a diagram illustrating a situation where the "other paper fingerprint information" and the "paper fingerprint information" are at the same position, and the both completely overlap with each other. A value obtained by Expression 1 under this situation is suppose to be E(0, 0).

Figure 26:
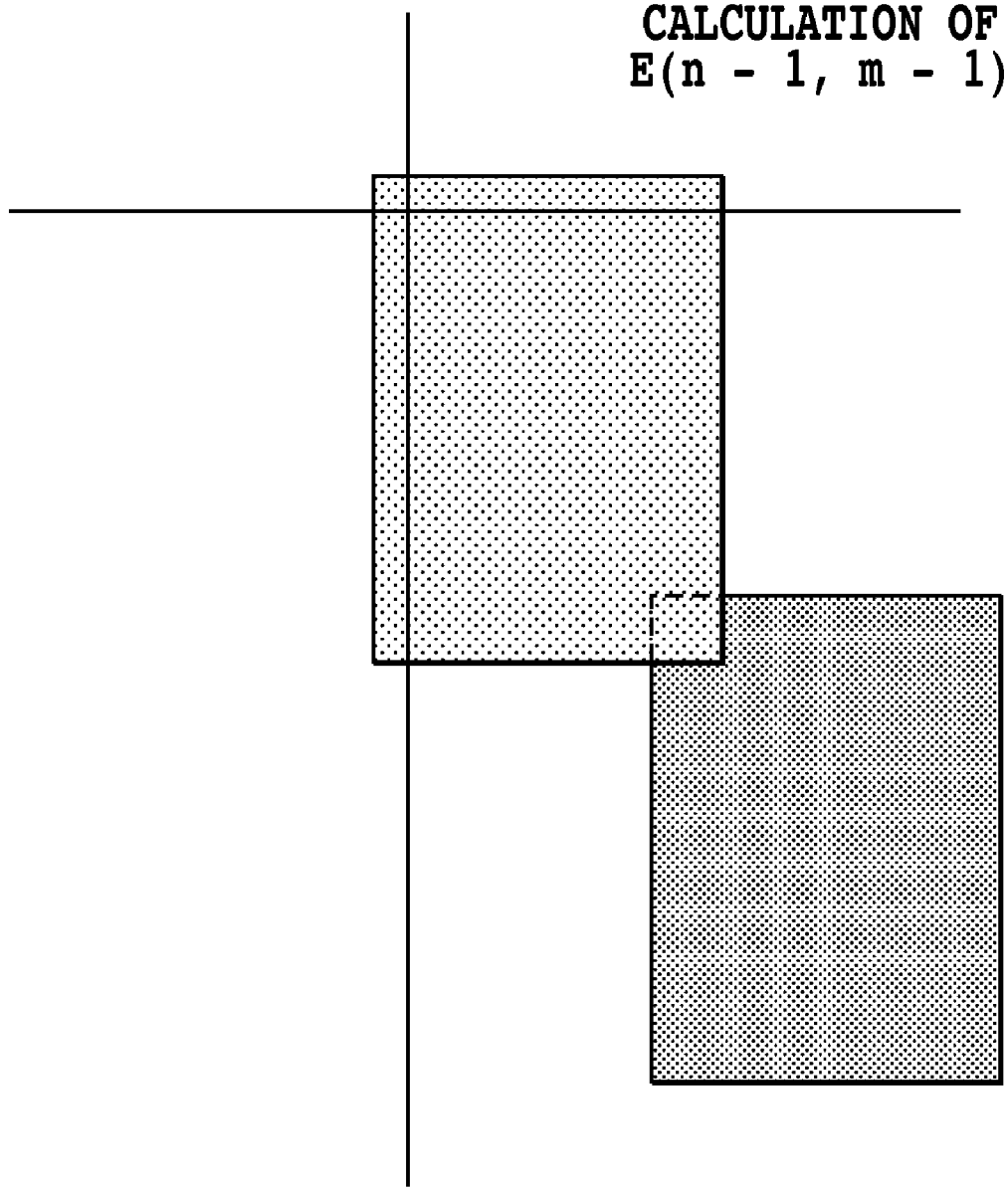
FIG. 26 is a diagram for explaining the paper fingerprint information checking processing.

FIG. 26 is a diagram illustrating a situation where a lower-right pixel of the "other paper fingerprint information" and an upper-left pixel of the "paper fingerprint information" overlap with each other. A value obtained by Expression 1 under this situation is suppose to be E(n−1, m−1).

As described above, by displacing the "paper fingerprint information", a group of [(2n−1)×(2m−1)] error values E(i, j) is obtained.

Now, in order to consider the meaning of Expression 1, consider the case where i=0, and j=0; and $\alpha_1$ (x, y)=1 (where x=0~n, y=0~m); and $\alpha_2$ (X−i, y−j)=1 (where x=0~n, y=0~m). That is, E(0, 0) for the case where $\alpha_1$ (x, y)=1 (where x=0~n, y=0~m) and $\alpha_2$(x−i, y−j)=1 (where x=0~n, y=0~m) is obtained.

Note that "i=0 and j=0" means that the "other paper fingerprint information" and the "paper fingerprint information" are at the same position as illustrated in FIG. 25.

Also, "$\alpha_1$ (x, y)=1 (where x=0~n, y=0~m)" means that all pixels of the "other paper fingerprint information" are bright. In other words, it means that any color material such as toner or ink, or dirt was not placed on a paper fingerprint information acquiring area when the "other paper fingerprint information" was acquired. Further, "$\alpha_2$ (x−i, y−j)=1 (where x=0~n, y=0~m)" means that all pixels of the "paper fingerprint information" are bright. In other words, it means that any color material such as toner or ink, or dirt was not placed on a paper fingerprint information acquiring area when the "paper fingerprint information" was acquired.

If $\alpha_1$ (x, y)=1 and $\alpha_2$ (x−i, y−j)=1 are satisfied for all the pixels, Expression 1 is expressed by:

$$E(0, 0) = \sum_{x=0, y=0}^{n,m} \{f_1(x, y) - f_2(x, y)\}^2$$

$\{f_1(x, y) - f_2(x, y)\}^2$ represents a square value of a difference between the gray scale image data in the "other paper fingerprint information" and that in the "paper fingerprint information". Accordingly, Expression 1 means a sum of square values of differences between the respective pixels of the "other paper fingerprint information" and those of the "paper fingerprint information". That is, the more the number of pairs of pixels respectively belonging to $f_1$ (x, y) and $f_2$ (x, y) that are similar to each other, the smaller the value E(0, 0).

The above describes how to obtain E (0, 0); however, the other E(i, j) values are also obtained in the same manner. The more the number of pairs of pixels respectively belonging to $f_1$(x, y) and $f_2$(x, y) that are similar to each other, the smaller the value E(i, j). Accordingly, if E(k, l)=min{E(i, j)}, a position at which the "other paper fingerprint information" is acquired and that at which the "paper fingerprint information" is acquired are displaced relative to each other by (k, l).

<Meaning of α>

The numerator of Expression 1 means a result of $\{f_1 (x, y) - f_2 (x-i, y-j)\}^2$ multiplied by $\alpha_1$ and $\alpha_2$ (to be exact, a summation value is further obtained by the α symbol). $\alpha_1$ and $\alpha_2$ represent "0" for a dark color pixel, and "1" for a light color pixel. Accordingly, if either $\alpha_1$ or $\alpha_2$ represents "0" (or the both represent "0"), $\alpha_1 \alpha_2 \{f_1(x, y) - f_2(x-i, y-j)\}^2$ becomes "0". That is, if a target pixel in any one (or both) of the two pieces of paper fingerprint information is dark colored, a density difference in the pixel is not considered. This is because any pixel on which dirt or color material is placed is ignored.

A total number to be summed by the Σ symbol is increased or decreased by the above processing, so that normalization is performed by dividing by $\Sigma\alpha_1$ (x, y) $\alpha_2$ (x−i, y−j). Note that the error value E(i, j) for a case where $\Sigma\alpha_1$ (x, y) $\alpha_2$ (x−i, y−j) in the denominator of Expression 1 becomes "0" is not included in the after-mentioned group of error values (E(−(n−1), −(m−1)~E(n−1, m−1)).

<Method for Determining Matching Level>

As described above, it turns out that if $E(k, l)=\min\{E(i, j)\}$, a position at which the "other paper fingerprint information" is acquired and that at which the "paper fingerprint information" is acquired are displaced relative to each other by (k, l).

Next, a value (matching level) indicating how the two pieces of paper fingerprint information are similar to each other is obtained with the use of the value $E(k, l)$ and the other value $E(i, j)$.

First, from the group of error values obtained by Expression 1 (e.g., E(0, 0)=10*, E(0, 1)=50, E(1, 0)=50, and E(1, 1)=50), an average value (40) is obtained (step A). Note that the symbol "*" does not have any mathematical meaning, but is simply used to pay attention to the value. The reason for this is described later.

Next, each of the error values (10*, 50, 50, and 50) is subtracted from the average value (40) to obtain a new group (30*, −10, −10, −10) (step B).

Then, from the new group, a standard deviation (30×30+ 10×10+10×10+10×10=1200, 1200/4=300, √300= 10√3=approx. 17) is obtained. Subsequently, the above new group is divided by 17 to obtain quotients (1*, −1, −1, and −1) (step C).

The maximum value of the obtained values is defined as the matching level (1*).

Note that the value of 1* is one corresponding to the value of E(0, 0)=10*. E(0, 0) refers to a value satisfying E(0, 0)=min{E(i, j)} in this case.

<Conceptual Explanation of Method for Determining Matching Level>

The processing for performing the method for determining the matching level is one for calculating a degree of separation between the smallest error value in the group of a plurality of error values and the average error value (steps A and B). Then, by dividing the degree of separation by the standard deviation, the matching level is obtained (step C). Finally, by comparing the matching level with a threshold, a checking result is obtained (step D).

Note that the standard deviation refers to an average value of "differences between the respective error values and the average value". In other words, the standard deviation is a value representing how much a variation totally occurs within the group.

If the degree of separation is divided by the total variation, one can find how min{E(i, j)} is small (extremely small or slightly small) in the group E(i, j).

If min{E(i, j)} is very extremely small in the group E (i, j), the checking result is determined to be valid, whereas in the other cases, it is determined to be invalid (step D)<Reason why it is determined to be valid only if min{E(i, j)} is very extremely small in group E(i, j).

Supposing that the "other paper fingerprint information" and the "paper fingerprint information" are acquired from the same paper, positions (displaced positions) at which the "other paper fingerprint information" and the "paper fingerprint information" extremely close to each other should exist. At the displaced positions, the "other paper fingerprint information" and the "paper fingerprint information" extremely close to each other, so that E(i, j) is supposed to be very small.

On the other hand, if only a little displacement is given from the displaced positions, a relationship is completely lost between the "other paper fingerprint information" and the "paper fingerprint information". Accordingly, E(i, j) is supposed to be a typical large value. Therefore, a condition of "two pieces of paper fingerprint information are acquired from the same paper" corresponds to a condition of "the smallest E(i, j) is extremely small in the group E(i, j)".

The above described the algorithm for paper fingerprint information checking processing.

The scope of the above embodiments also includes a processing method comprising: storing on a recording medium a program for realizing the functions of the above embodiments; reading out the program stored on the recording medium as a code; and executing it on a computer. Also, the above embodiments include the above program itself as well as the computer-readable recording medium storing thereon the above program. Such recording medium includes, for example, a floppy disk, hard disk, optical disk, magnetooptical disk, CD-ROM, magnetic tape, nonvolatile memory card, or ROM. The scope of the above embodiments includes not only the above method performing the processing solely with the program stored on the above-described recording medium, but also those operating under OS to perform the operations of the above embodiments, in conjunction with other software, and a function of an expansion board.

Besides, a method for supplying the program includes one in which a browser of a client computer is used to download from a homepage on the Internet the program or a file including a compressed version of the program and an automatic installation function. Also, the method can be provided by dividing the program code constituting the program of the present invention into a plurality of files, and downloading them from different homepages, respectively. That is, the present invention includes a WWW server allowing a plurality of users to download the program files for realizing processing of the functions of the present invention with a computer.

Also, the following configuration may be made: The previously described program is distributed to users with being encrypted and stored on a recording medium such as a CD-ROM, and some of the users, who have cleared a predetermined condition, are allowed to download deciphering key information from the Internet. Then, the key information is used to execute the encrypted program for installation in a computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-114607, filed Apr. 24, 2007, which is hereby incorporated by reference herein in its entirety.

What is claimed is:

1. An image forming device comprising:
a component for scanning original image data from an original;
a component for scanning paper fingerprint information from the original;
a component for associating the original image data and the paper fingerprint information with each other to register them in an information processing device;
a component for transmitting paper fingerprint information scanned from an original to the information processing device, and requesting the information processing device to determine whether or not the paper fingerprint information has been registered;
a component for (i) upon receipt of a result of the determination from the information processing device that the paper fingerprint information has been registered, retrieving from the information processing device the original image data, which previously was scanned from the original by the component for scanning original image data and previously was registered in the information processing device in association with the paper fingerprint information, and applying image processing, or (ii) upon receipt of a result of the determination from the information processing device that the paper fingerprint information has not been registered, applying the image processing to the original image data currently scanned from the original; and a component for printing out the image-processed original image data.

2. The image forming device of claim 1, wherein the component for registering, upon receipt of the result of the determination from the information processing device that the paper fingerprint information has not been registered, further associates the original image data scanned from the original and the paper fingerprint information that has not been registered with each other to register them in the information processing device.

3. The image forming device of claim 1, further comprising a component for scanning paper fingerprint information from paper that has been subjected to printing.

4. The image forming device of claim 2, further comprising a component for scanning paper fingerprint information from paper that has been subjected to printing.

5. An image forming device comprising:
   a component for scanning original image data from an original;
   a component for scanning paper fingerprint information from the original;
   a component for associating the original image data and the paper fingerprint information with each other to register them in a component for storing;
   a component for determining whether or not paper fingerprint information scanned from an original has been registered;
   a component for (i) upon output by the component for determining of a result of the determination that the paper fingerprint information has been registered, applying image processing to the original image data, which previously was scanned from the original by the component for scanning original image data and previously was registered in the component for storing in association with the paper fingerprint information, or (ii) upon output by the component for determining of a result of the determination that the paper fingerprint information has not been registered, applying the image processing to the original image data currently scanned from the original; and
   a component for printing out the image-processed original image data.

6. The image forming device of claim 5, wherein the component for registering, upon the component for determining outputting the result of the determination that the paper fingerprint information has not been registered, further associates the original image data scanned from the original and the paper fingerprint information that has not been registered with each other to register them.

7. The image forming device of claim 5, further comprising a component for scanning paper fingerprint information from paper that has been subjected to printing.

8. The image forming device of claim 6, further comprising a component for scanning paper fingerprint information from paper that has been subjected to printing.

9. An image forming device comprising:
   a component for scanning a plurality of pieces of original image data from an original comprising a plurality of pages;
   a component for scanning paper fingerprint information of some of the plurality of pages of the original rather than all of the pages of the original comprising a plurality of pages;
   a component for associating the plurality of pieces of the original image data and the paper fingerprint information scanned from some of the plurality of pages of the original rather than all of the plurality of the pages of the original with each other to register them in a component for storing;
   a component for determining whether or not paper fingerprint information scanned from an original has been registered;
   a component for (i) upon output by the component for determining of a result of the determination that the paper fingerprint information has been registered, applying image processing to the plurality of pieces of the original image data which previously were scanned from the original by the component for scanning original image data and previously were registered in the component for storing in association with the paper fingerprint information, or (ii) upon output by the component for determining of a result of the determination that the paper fingerprint information has not been registered, applying the image processing to the original image data currently scanned from the original; and
   a component for printing out the image-processed original image data.

10. An image forming method implemented in an image forming device, the method comprising:
    a step of scanning original image data from an original;
    a step of scanning paper fingerprint information from the original;
    a step of associating the original image data and the paper fingerprint information with each other to register them in a component for storing;
    a step of determining whether or not paper fingerprint information scanned from an original has been registered;
    a step of (i) upon output in the step of determining of a result of the determination that the paper fingerprint information has been registered, applying image processing to the original image data which previously was scanned from the original in a previous instance of executing the step of scanning original image data and previously was registered in the component for storing in association with the paper fingerprint information, or (ii) upon output in the step of determining of a result of the determination that the paper fingerprint information has not been registered, applying the image processing to the original image data scanned from the original in a current instance of executing the step of scanning original image data; and
    a step of printing out the image-processed original image data.

11. An image forming method implemented in an image forming device comprising:
    a step of scanning a plurality of pieces of original image data from an original comprising a plurality of pages;
    a step of scanning paper fingerprint information of some of the plurality pages of the original rather than all of plurality of pages of the original;
    a step of associating the plurality of pieces of the original image data and the paper fingerprint information of some of the plurality of pages of the original rather than all of the plurality of pages of the original with each other to register them in a component for storing;

a step of determining whether or not paper fingerprint information scanned from an original has been registered;

a step of (i) upon output in the step of determining of a result of the determination that the paper fingerprint information has been registered, applying image processing to the plurality of pieces of the original image data which previously were scanned from the original in a previous instance of executing the step of scanning original image data and previously were registered in the component for storing in association with the paper fingerprint information, or (ii) upon output in the step of determining of a result of the determination that the paper fingerprint information has not been registered, applying the image processing to the original image data scanned from the original in a current instance of executing the step of scanning original image data; and a step of printing out the image-processed original image data.

* * * * *